United States Patent
Liu et al.

(10) Patent No.: US 12,531,662 B2
(45) Date of Patent: Jan. 20, 2026

(54) METHOD AND APPARATUS USED IN NODE FOR WIRELESS COMMUNICATION

(71) Applicant: Quectel Wireless Solutions Co., Ltd., Shanghai (CN)

(72) Inventors: Zheng Liu, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 316 days.

(21) Appl. No.: 18/475,111

(22) Filed: Sep. 26, 2023

(65) Prior Publication Data
US 2024/0022354 A1   Jan. 18, 2024

Related U.S. Application Data

(63) Continuation of application No. PCT/CN2021/125389, filed on Oct. 21, 2021.

(30) Foreign Application Priority Data

Mar. 31, 2021   (CN) .......................... 202110345649.7

(51) Int. Cl.
*H04L 1/1812* (2023.01)
*H04L 1/00* (2006.01)
(Continued)

(52) U.S. Cl.
CPC .......... *H04L 1/1812* (2013.01); *H04L 1/0009* (2013.01); *H04W 72/21* (2023.01); *H04W 72/56* (2023.01)

(58) Field of Classification Search
CPC ... H04L 1/1812; H04L 1/0009; H04L 1/0067; H04L 1/0073; H04L 2001/0093;
(Continued)

(56) References Cited

U.S. PATENT DOCUMENTS

2019/0053218 A1\*   2/2019   Kim ...................... H04L 1/1812
2020/0228173 A1\*   7/2020   Ye ......................... H04B 7/0478
(Continued)

FOREIGN PATENT DOCUMENTS

CN   104885534 A   9/2015
CN   111314033 A   6/2020
(Continued)

OTHER PUBLICATIONS

Extended European Search Report issued in counterpart European Patent Application No. 21934484.3, dated Jul. 10, 2024.
(Continued)

*Primary Examiner* — Abdullahi Ahmed
(74) *Attorney, Agent, or Firm* — Westbridge IP LLC

(57) ABSTRACT

A method applied to a first node for wireless communication includes receiving a first information block, transmitting a first PUCCH. The target coding method is one of a first candidate method or a second candidate method, and the first information block is used to determine the target coding method from the first candidate method and the second candidate method. In response to the target coding method being the first candidate method, a bit block obtained by the first bit block through channel coding and a bit block obtained by the second bit block through channel coding are used together to generate the first PUCCH. In response to the target coding method being the second candidate method, bit blocks generated together with the first bit block and the second bit block are used to generate the first PUCCH through channel coding.

20 Claims, 6 Drawing Sheets

(51) Int. Cl.
 *H04W 72/21* (2023.01)
 *H04W 72/56* (2023.01)
(58) Field of Classification Search
 CPC ... H04L 1/1614; H04L 1/1861; H04L 1/1896; H04L 5/0055; H04L 1/1854; H04L 1/0023; H04W 72/21; H04W 72/56
 See application file for complete search history.

(56) References Cited

U.S. PATENT DOCUMENTS

| | | | |
|---|---|---|---|
| 2020/0259625 A1* | 8/2020 | Papasakellariou | H04B 7/0456 |
| 2022/0116157 A1* | 4/2022 | Papasakellariou | H04L 1/1664 |
| 2023/0059861 A1* | 2/2023 | Liu | H04L 5/0055 |
| 2024/0204967 A1* | 6/2024 | Hu | H04L 1/1854 |

FOREIGN PATENT DOCUMENTS

| | | |
|---|---|---|
| CN | 112019315 A | 12/2020 |
| CN | 112187424 A | 1/2021 |
| CN | 113489566 A | 10/2021 |
| EP | 3681072 A1 | 7/2020 |
| WO | 2012022198 A1 | 2/2012 |
| WO | 2020092264 A1 | 5/2020 |
| WO | 2020146247 A2 | 7/2020 |

OTHER PUBLICATIONS

First Office Action issued in counterpart Chinese Patent Application No. 202110345649.7, dated Jul. 15, 2022.
Grant Notification issued in counterpart Chinese Patent Application No. 202110345649.7, dated Oct. 20, 2022.
Huawei et al., R1-1812222 UCI enhancements for URLLC, 3GPP TSG_RAN WG1 Meeting #95, dated Nov. 16, 2018.
Intel Corporation, R1-1710553 Structure of 1~2 bits HARQ-ACK long PUCCH with TDM DMRS, 3GPP tsg_ran \WG1_RL1, dated Jun. 17, 2017.
InterDigital, Inc., R1-1813163 Potential UCI enhancements for URLLC, 3GPP TSG RAN WG1 Meeting #95, dated Nov. 16, 2018.
International Search Report issued in corresponding PCT Application No. PCT/CN2021/125389, dated Jul. 28, 2022.
Moderator(OPPO), R1-2009546 Email discussion summary for R17 intra-UE MUX—final version, 3GPP tsg_ran \wg1_rl1, dated Nov. 18, 2020.
Nokia, R1-2100729 Nokia_Rel-17_IIoT_intra-UE, 3GPP tsg_ran\wg1_rl1, dated Jan. 18, 2021.
Panasonic, R1-104892 Further considerations on ACK/NACK multiplexing schemes on PUSCH, 3GPP tsg_ran \WG1_RL1, dated Aug. 17, 2010.

* cited by examiner

| Bit state | "00" | "01" | "10" | "11" |
|---|---|---|---|---|
| Indicating information | Indicating priority index=0 | Indicating priority index=1, associated with HARQ-ACK non-multiplexing with different priority levels | Indicating priority index=1, associated with HARQ-ACK multiplexing with different priority levels, separate coding | Indicating priority index=1, associated with HARQ-ACK multiplexing with different priority levels, joint coding |

FIG. 7

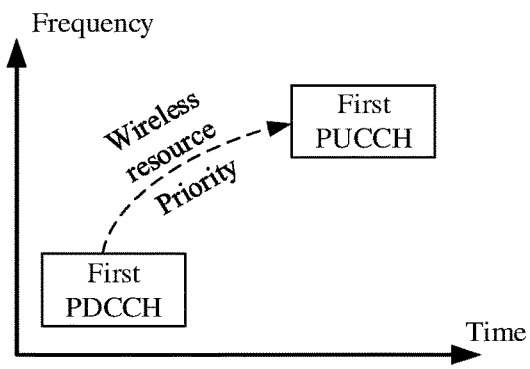

FIG. 8

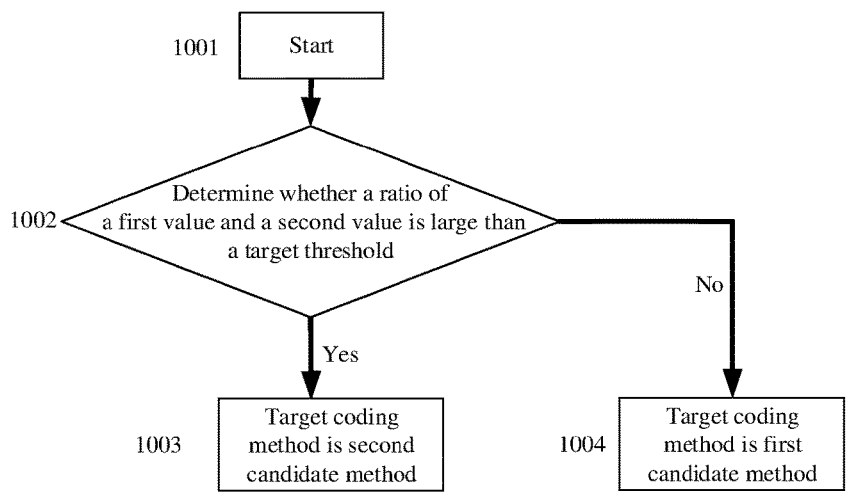

FIG. 9

METHOD AND APPARATUS USED IN NODE FOR WIRELESS COMMUNICATION

CROSS-REFERENCE TO RELATED APPLICATIONS

The present application is a continuation of International Application No. PCT/CN2021/125389, filed on Oct. 21, 2021, which claims priority to Chinese Patent Application No. 202110345649.7, filed on Mar. 31, 2021. All of the aforementioned applications are incorporated herein by reference in their entireties.

TECHNICAL FIELD

The present application relates to the technical field of wireless communication, and in particular to transmission method and transmission apparatus in wireless communication system, especially a transmission solution and a transmission apparatus for information with different priority levels in wireless communication.

BACKGROUND

The application scenarios of a future wireless communication system are becoming increasingly diverse, and different application scenarios require different performance requirements for the future wireless communication system. In order to meet the different performance requirements of various application scenarios, it was decided to conduct research on the new radio (NR) technology (or 5G) at the 72nd plenary session of the $3^{rd}$ generation partner project (3GPP) radio access network (RAN). The work item (WI) of the new NR technology was passed at the 75th plenary session of the 3GPP RAN, and standardization work on NR is started. At the 86th plenary meeting of 3GPP RAN, it was decided to start the work on the study item (SI) and work item (WI) of NR Rel-17.

In the NR technology, enhanced mobile broadband (eMBB), ultra-reliable and low latency communications (URLLC), and massive machine type communications (mMTC) are the three main application scenarios.

SUMMARY

A method applied to a first node for wireless communication is provided according to the present application, and the method includes:
  receiving a first information block; and
  transmitting a first physical uplink control channel (PUCCH), where a first bit block and a second bit block are used to generate the first PUCCH through a target coding method, the first bit block includes at least one hybrid automatic repeat request-acknowledgement (HARQ-ACK) bit, and the second bit block includes at least one HARQ-ACK bit,
  where the target coding method is one of a first candidate method or a second candidate method, and the first information block is used to determine the target coding method from the first candidate method and the second candidate method; in response to the target coding method being the first candidate method, a bit block obtained by the first bit block through channel coding and a bit block obtained by the second bit block through channel coding are used together to generate the first PUCCH; in response to the target coding method being the second candidate method, bit blocks generated together with the first bit block and the second bit block are used to generate the first PUCCH through channel coding; a priority index of HARQ-ACK bits in the first bit block is equal to a first level index, a priority index of HARQ-ACK bits in the second bit block is equal to the second level index, and the first level index is not equal to the second level index.

A method applied to a second node for wireless communication is provided according to the present application, and the method includes:
  transmitting a first information block; and
  receiving a first PUCCH, where a first bit block and a second bit block are used to generate the first PUCCH through the target coding method, the first bit block includes at least one HARQ-ACK bit, and the second bit block includes at least one HARQ-ACK bit,
  where the target coding method is one of a first candidate method or a second candidate method, and the first information block is used to determine the target coding method from the first candidate method and the second candidate method; in response to the target coding method being the first candidate method, a bit block obtained by the first bit block through channel coding and a bit block obtained by the second bit block through channel coding are used together to generate the first PUCCH; in response to the target coding method being the second candidate method, bit blocks generated together with the first bit block and the second bit block are used to generate the first PUCCH through channel coding; a priority index of HARQ-ACK bits in the first bit block is equal to a first level index, a priority index of HARQ-ACK bits in the second bit block is equal to the second level index, and the first level index is not equal to the second level index.

A first node device for wireless communication is provided according to the present application, and the first node device includes:
  a first receiver to receive a first information block; and
  a first transmitter to transmit a first physical uplink control channel (PUCCH), where a first bit block and a second bit block are used to generate the first PUCCH through the target coding method, the first bit block includes at least one HARQ-ACK bit, and the second bit block includes at least one HARQ-ACK bit,
  where the target coding method is one of a first candidate method or a second candidate method, and the first information block is used to determine the target coding method from the first candidate method and the second candidate method; in response to the target coding method being the first candidate method, a bit block obtained by the first bit block through channel coding and a bit block obtained by the second bit block through channel coding are used together to generate the first PUCCH; in response to the target coding method being the second candidate method, bit blocks generated together with the first bit block and the second bit block are used to generate the first PUCCH through channel coding; a priority index of HARQ-ACK bits in the first bit block is equal to a first level index, a priority index of HARQ-ACK bits in the second bit block is equal to the second level index, and the first level index is not equal to the second level index.

A second node device for wireless communication is provided according to the present application, and the second node device includes:

a second receiver to receive a first information block; and
a second transmitter to transmit a first PUCCH, where a first bit block and a second bit block are used to generate the first PUCCH through the target coding method, the first bit block includes at least one HARQ-ACK bit, and the second bit block includes at least one HARQ-ACK bit, where the target coding method is one of a first candidate method or a second candidate method, and the first information block is used to determine the target coding method from the first candidate method and the second candidate method; in response to the target coding method being the first candidate method, a bit block obtained by the first bit block through channel coding and a bit block obtained by the second bit block through channel coding are used together to generate the first PUCCH; in response to the target coding method being the second candidate method, bit blocks generated together with the first bit block and the second bit block are used to generate the first PUCCH through channel coding; a priority index of HARQ-ACK bits in the first bit block is equal to a first level index, a priority index of HARQ-ACK bits in the second bit block is equal to the second level index, and the first level index is not equal to the second level index.

BRIEF DESCRIPTION OF THE DRAWINGS

By reading and referring to the detailed description of non-limiting embodiments in the following drawings, the other features, objectives, and advantages of the present application will become more apparent:

FIG. 7 is a schematic diagram of a first information block according to still another embodiment of the present application;

FIG. 8 is a schematic diagram of a relationship between a first physical downlink control channel (PDCCH) and a first PUCCH according to still another embodiment of the present application;

FIG. 9 is a schematic diagram of a relationship between a ratio of a first value to a second value and a target threshold according to still another embodiment of the present application;

DETAILED DESCRIPTION OF THE EMBODIMENTS

Figure 1:
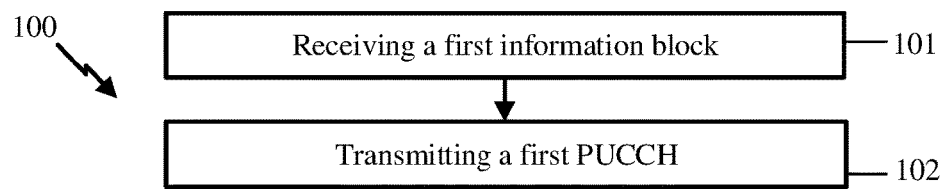
FIG. 1 is a flowchart of a first information block and a first PUCCH according to an embodiment of the present application.

In URLLC communications, there are transmissions of data or control information with different priority levels. In NR Rel-16, in response to uplink control information (UCI) with different priority levels colliding in the time domain, lower priority UCI is discarded to ensure the transmission of higher priority UCI. In NR Rel-17, multiplexing of UCI with different priority levels is supported on the same PUCCH or the same physical uplink shared channel (PUSCH).

The present application proposes a solution for the multiplexing of UCI with different priority levels. A method applied to a first node for wireless communication is provided according to the present application, and the method includes: receiving a first information block, and transmitting a first PUCCH, where a first bit block and a second bit block are used to generate the first PUCCH through the target coding method, the first bit block includes at least one HARQ-ACK bit, and the second bit block includes at least one HARQ-ACK bit. The target coding method is one of a first candidate method or a second candidate method, and the first information block is used to determine the target coding method from the first candidate method and the second candidate method. In response to the target coding method being the first candidate method, a bit block obtained by the first bit block through channel coding and a bit block obtained by the second bit block through channel coding are used together to generate the first PUCCH. In response to the target coding method being the second candidate method, bit blocks generated together with the first bit block and the second bit block are used to generate the first PUCCH through channel coding. A priority index of HARQ-ACK bits in the first bit block is equal to a first level index, a priority index of HARQ-ACK bits in the second bit block is equal to the second level index, and the first level index is not equal to the second level index. It should be noted that in the description of the present application, URLLC is only used as a typical application scenario or example. The present application is also applicable to other scenarios facing similar problems (e.g., scenarios where multiple businesses coexist, or scenarios where information with different priority levels is multiplexed, or scenarios where business multiplexing has different quality of service (QoS) requirements, or for different application scenarios, such as Internet of Vehicles and eMBB multiplexing, etc.), and similar technical effects can also be achieved. In addition, adopting a unified solution for different scenarios (including but not limited to URLLC scenarios) can also help reduce hardware complexity and costs. Without conflict, the embodiments, and features in the first node device of the present application can be applied to the second node device, and vice versa. Specifically, for the interpretation of terminologies, nouns, functions, and variables in the present application (if not otherwise specified), reference may be made to the definitions in the 3GPP standard protocols TS36 series, TS38 series, and TS37 series.

As an embodiment, the HARQ-ACK bits with different priority levels are configured through signaling to use separate channel coding or joint channel coding. Therefore, different coding methods can be adopted according to different situations to optimize the link performance of HARQ-ACK multiplexing.

As an embodiment, combining HARQ-ACK multiplexing instructions with coding method instructions can provide flexible configuration of coding methods without increasing signaling overhead.

As an embodiment, downlink control information (DCI) is used to indicate the coding method of the HARQ-ACK bits with different priority levels. The coding method can be dynamically adjusted according to the situation, thereby improving configuration flexibility while further optimizing the transmission performance of the HARQ-ACK bits.

As an embodiment, by configuring the threshold of the ratio of the number of HARQ-ACK bits with different priority levels through signaling, the HARQ-ACK bits with different priority levels can be dynamically adjusted according to the situation, while improving configuration flexibility and further optimizing the transmission performance of HARQ-ACK.

As an embodiment, the method in the present application has the following advantages:

the method in the present application uses signaling to configure whether the HARQ-ACK bits with different priority levels adopt separate channel coding or joint channel coding, so that different coding methods can be adopted according to different situations to optimize the link performance of HARQ-ACK during HARQ-ACK multiplexing;

the method in the present application combines HARQ-ACK multiplexing instructions with coding method instructions to provide flexible configuration of coding methods without increasing signaling overhead;

the method in the present application uses DCI to indicate the coding method of HARQ-ACK with different priority levels. The coding method can be dynamically adjusted according to the situation, improving configuration flexibility while further optimizing the transmission performance of HARQ-ACK;

the method in the present application involves configuring the threshold of the ratio of the number of HARQ-ACK bits with different priority levels through signaling, in order to comprehensively consider the different priority levels of HARQ-ACK bits. The coding method can be dynamically adjusted according to the situation, while improving configuration flexibility and further optimizing the transmission performance of HARQ-ACK.

The following will provide further detailed explanations of the technical solution of the present application in conjunction with the accompanying drawings. It should be noted that, without conflict, the embodiments, and features in the embodiments of the present application can be arbitrarily combined with each other.

First Embodiment

In the first embodiment, the flowchart 100 of the first information block and the first PUCCH according to an embodiment of the present application is described, as shown in FIG. 1. In FIG. 1, each box represents an operation, and it should be emphasized that the order of each box in the figure does not represent the chronological relationship between the operations represented.

In the first embodiment, the first node device in the present application receives the first information block in operation 101. The first node device in the present application transmits a first PUCCH in operation 102, and the first bit block and the second bit block are used to generate the first PUCCH through the target coding method. The first bit block includes at least one HARQ-ACK bit, and the second bit block includes at least one HARQ-ACK bit. The target coding method is one of a first candidate method or a second candidate method, and the first information block is used to determine the target coding method from the first candidate method and the second candidate method. In response to the target coding method being the first candidate method, a bit block obtained by the first bit block through channel coding and a bit block obtained by the second bit block through channel coding are used together to generate the first PUCCH. In response to the target coding method being the second candidate method, bit blocks generated together with the first bit block and the second bit block are used to generate the first PUCCH through channel coding. A priority index of HARQ-ACK bits in the first bit block is equal to a first level index, a priority index of HARQ-ACK bits in the second bit block is equal to the second level index, and the first level index is not equal to the second level index.

As an embodiment, the first information block is transmitted through radio or wireless interface.

As an embodiment, the first information block includes all or part of a high-level signaling or physical layer signaling.

As an embodiment, the first information block includes all or part of a radio resource control (RRC) layer signaling or medium access control (MAC) layer signaling.

As an embodiment, the first information block includes all or part of a system information block (SIB).

As an embodiment, the first information block is cell specific or UE specific.

As an embodiment, the first information block is per bandwidth part (BWP) configured.

As an embodiment, the first information block includes all or part of a DCI signaling field.

As an embodiment, the first information block includes all or part of the fields in a DCI format.

As an embodiment, the first information block includes a priority indication field in a DCI format.

As an embodiment, the first information block includes a coding mode indicator field in a DCI format.

As an embodiment, the first information block includes all or part of the fields in a DCI format 1_2.

As an embodiment, the first information block includes all or part of the fields in a DCI format 1_3.

As an embodiment, the first information block is carried through PDCCH.

As an embodiment, the first information block includes more than one sub information block, and each sub information block in the first information block is an information element (IE) or a field in the RRC signaling to which the first information block belongs. One or more sub information blocks in the first information block are used to determine the target coding method from the first candidate method and the second candidate method.

As an embodiment, the first information block includes all or part of the fields in IE "PUCCH-Config" in an RRC signaling.

As an embodiment, the first information block includes all or part of the fields in IE "PDSCH-Config" in an RRC signaling.

As an embodiment, the first information block includes all or part of the fields in the IE "PUCCH-ConfigCommon" in an RRC signaling.

As an embodiment, the first information block includes all or part of the fields in the IE "BWP-UplinkDedicated" in an RRC signaling.

As an embodiment, the first information block includes all or part of the fields in the IE "pucch-ConfigurationList" in an RRC signaling.

As an embodiment, the first information block includes all or part of the fields in the second "PUCCH-Config" IE in the IE "pucch-ConfigurationList" of an RRC signaling.

As an embodiment, the first information block includes all or part of the fields in the "PUCCH-Config" IE with a corresponding priority index of "1" in the IE "pucch-ConfigurationList" of an RRC signaling.

As an embodiment, the first information block includes all or part of the fields in the "PUCCH-Config" IE with a corresponding priority index of "0" in the IE "pucch-ConfigurationList" of an RRC signaling.

As an embodiment, the first information block includes all or part of the fields in the IE "PUCCH-Config" corresponding to a large priority index in the IE "pucch-ConfigurationList" of an RRC signaling.

As an embodiment, the first information block includes all or part of the fields in the IE "PUCCH-Config" corresponding to a small priority index in the IE "pucch-ConfigurationList" of an RRC signaling.

As an embodiment, the technical feature "the first information block is used to determine the target coding method from the first candidate method and the second candidate method" in the claims includes the following operation: the first information block is used by the first node device in the present application to determine the target coding method from the first candidate method and the second candidate method.

As an embodiment, the technical feature "the first information block is used to determine the target coding method from the first candidate method and the second candidate method" in the claims includes the following operation: the first information block is used to explicitly or implicitly indicate the target coding method from the first candidate method and the second candidate method.

As an embodiment, the technical feature "the first information block is used to determine the target coding method from the first candidate method and the second candidate method" in the claims includes the following operation: the first information block is used to indicate whether the target coding method is the first candidate method or the second candidate method.

As an embodiment, the technical feature "the first information block is used to determine the target coding method from the first candidate method and the second candidate method" in the claims includes the following operation: the first information block is used to determine the target threshold in the present application.

As an embodiment, the technical feature "the first information block is used to determine the target coding method from the first candidate method and the second candidate method" in the claims is implemented through claim 4 of the present application.

As an embodiment, the first PUCCH includes an RF signal of the PUCCH.

As an embodiment, the first PUCCH includes a baseband signal of the PUCCH.

As an embodiment, the first PUCCH carries UCI.

As an embodiment, a UCI payload using a UCI format is used to generate the first PUCCH.

As an embodiment, the first PUCCH adopts the PUCCH format 0.

As an embodiment, the first PUCCH adopts PUCCH format 1.

As an embodiment, the first PUCCH adopts the PUCCH format 2.

As an embodiment, the first PUCCH adopts PUCCH format 3 or 4.

As an embodiment, the first PUCCH occupies only one physical resource block (PRB) in the frequency domain.

As an embodiment, the first PUCCH occupies more than one PRB in the frequency domain.

As an embodiment, the first bit block includes information bits and cyclic redundancy check (CRC) bits.

As an embodiment, the first bit block only includes information bits.

As an embodiment, the second bit block includes information bits and CRC bits.

As an embodiment, the second bit block only includes information bits.

As an embodiment, the first bit block only includes one HARQ-ACK bit.

As an embodiment, the first bit block includes more than one HARQ-ACK bit.

As an embodiment, the first bit block includes bits other than HARQ-ACK bits.

As an embodiment, the first bit block is a UCI payload.

As an embodiment, the second bit block only includes one HARQ-ACK bit.

As an embodiment, the second bit block includes more than one HARQ-ACK bit.

As an embodiment, the second bit block includes bits other than HARQ-ACK bits.

As an embodiment, the second bit block is a UCI payload.

As an embodiment, the first bit block only includes HARQ-ACK bits.

As an embodiment, the second bit block only includes HARQ-ACK bits.

As an embodiment, the technical feature "the first bit block and the second bit block are used to generate the first PUCCH through the target coding method" in the claims includes the following operation: the first bit block and the second bit block are used by the first node device in the present application to generate the first PUCCH through the target coding method.

As an embodiment, the technical feature "a first bit block and a second bit block are used to generate the first PUCCH through the target coding method" in the claims includes the following operation: all or part of the bits in the first bit block and all or part of the bits in the second bit block are used to generate the first PUCCH through the target coding method.

As an embodiment, the technical feature "a first bit block and a second bit block are used to generate the first PUCCH through the target coding method" in the claims includes the following operation: the first bit block and the second bit block are used together to generate the first PUCCH through the target coding method.

As an embodiment, the technical feature "a first bit block and a second bit block are used to generate the first PUCCH through the target coding method" in the claims is implemented through claim 6 of the present application.

As an embodiment, the technical feature "a first bit block and a second bit block are used to generate the first PUCCH through the target coding method" in the claims includes the following operation: the first bit block and the second bit block are directly or indirectly used to generate the first PUCCH through the target coding method.

As an embodiment, the technical feature "a first bit block and a second bit block are used to generate the first PUCCH through the target coding method" in the claims includes the following operation: the first PUCCH carries all or part of the bits in the first bit block, the first PUCCH carries all or part of the bits in the second bit block, and the first PUCCH is generated through the target coding method.

As an embodiment, the first candidate method is a separate coding method.

As an embodiment, the first candidate method is channel coding with low priority HARQ-ACK bits and high priority HARQ-ACK bits, respectively.

As an embodiment, the first candidate method is to encode HARQ-ACK bits with different priorities separately for channel coding.

As an embodiment, the first candidate method is to encode HARQ-ACK bits with different priorities using independent channels.

As an embodiment, the first candidate method is a channel coding method using UCIs with different priority levels.

As an embodiment, the second candidate method is joint coding.

As an embodiment, the second candidate method is a channel coding method that combines low priority HARQ-ACK bits and high priority HARQ-ACK bits.

As an embodiment, the second candidate method is a channel coding method in which HARQ-ACK bits with different priorities are jointly coded.

As an embodiment, the second candidate approach is to encode HARQ-ACK bits with different priorities using the same channel encoder.

As an embodiment, the second candidate method is a channel coding method in which UCIs with different priorities are jointly coded.

As an embodiment, the second candidate method is to use a channel encoder to encode HARQ-ACK bits with different priorities, which are concatenated or compressed to obtain a block of bits.

As an embodiment, in response to the target coding method being the first candidate method, the channel coding through which the first bit block passes includes polar coding.

As an embodiment, in response to the target coding method being the first candidate method, the channel coding through which the first bit block passes include channel coding of small block lengths.

As an embodiment, in response to the target coding method being the first candidate method, the channel coding through which the first bit block passes includes Reed-Muller (RM) coding.

As an embodiment, in response to the target coding method being the first candidate method, the first bit block undergoes CRC calculation before being input into the channel encoder.

As an embodiment, in response to the target coding method being the first candidate method, the first bit block is attached by CRC before being input to the channel encoder.

As an embodiment, in response to the target coding method being the first candidate method, the channel coding through which the second bit block passes includes polar coding.

As an embodiment, in response to the target coding method being the first candidate method, the channel coding through which the second bit block passes includes channel coding of small block lengths.

As an embodiment, in response to the target coding method being the first candidate method, the channel coding through which the second bit block passes includes RM coding.

As an embodiment, in response to the target coding method being the first candidate method, the second bit block undergoes CRC calculation before being input into the channel encoder.

As an embodiment, in response to the target coding method being the first candidate method, the second bit block is attached by CRC before being input to the channel encoder.

As an embodiment, the technical feature "a bit block obtained by the first bit block through channel coding and a bit block obtained by the second bit block through channel coding are used together to generate the first PUCCH" in the claims includes the following operation: a bit block obtained by the first bit block through channel coding and a bit block obtained by the second bit block through channel coding are used by the first node device in the present application to generate the first PUCCH.

As an embodiment, the technical feature "a bit block obtained by the first bit block through channel coding and a bit block obtained by the second bit block through channel coding are used together to generate the first PUCCH" in the claims includes the following operation: a bit block obtained by the first bit block through channel coding is concatenated with the rate matched bit block, and a bit block obtained by the second bit block through channel coding is concatenated with the rate matched bit block to generate the first PUCCH.

As an embodiment, the technical feature "a bit block obtained by the first bit block through channel coding and a bit block obtained by the second bit block through channel coding are used together to generate the first PUCCH" in the claims includes the following operation: a bit block obtained by the first bit block through channel coding is sequentially subjected to rate matching and code block concatenation to generate a first target bit sequence, and a bit block obtained by the second bit block through channel coding is sequentially subjected to rate matching and code block concatenation to generate a second target bit sequence. The first target bit sequence and the second target bit sequence are then multiplexed to the first PUCCH.

As an embodiment, the technical feature "a bit block obtained by the first bit block through channel coding and a bit block obtained by the second bit block through channel coding are used together to generate the first PUCCH" in the claims includes the following operation: a bit block obtained by the first bit block through channel coding is sequentially subjected to rate matching and code block concatenation to generate a first target bit sequence, and a bit block obtained by the second bit block through channel coding is sequentially subjected to rate matching and code block concatenation to generate a second target bit sequence. A bit sequence obtained by multiplexing the first target bit sequence and the second target bit sequence to PUCCH is sequentially processed by scrambling, modulation, and spreading or block-wise spreading, mapping to physical resources, orthogonal frequency division multiplexing (OFDM) baseband signal generation, modulation and upconversion to generate the first PUCCH.

As an embodiment, the technical feature "a bit block obtained by the first bit block through channel coding and a bit block obtained by the second bit block through channel coding are used together to generate the first PUCCH" in the claims includes the following operation: a bit block obtained by the first bit block through channel coding is sequentially subjected to rate matching and code block concatenation to generate a first target bit sequence, and a bit block obtained by the second bit block through channel coding is sequentially subjected to rate matching and code block concatenation to generate a second target bit sequence. A bit sequence obtained by multiplexing the first target bit sequence and the second target bit sequence to PUCCH is sequentially processed by scrambling, modulation, and spreading or block-wise spreading, mapping to physical resources, OFDM baseband signal generation, modulation and upconversion to generate the first PUCCH.

As an embodiment, The technical feature "a bit block obtained by the first bit block through channel coding and a bit block obtained by the second bit block through channel coding are used together to generate the first PUCCH" in the claims includes the following operation: a bit block obtained by the first bit block through channel coding is sequentially subjected to rate matching and code block concatenation to generate a first target bit sequence, and a bit block obtained by the second bit block through channel coding is sequentially subjected to rate matching and code block concatenation to generate a second target bit sequence. A bit sequence obtained by multiplexing the first target bit sequence and the second target bit sequence to PUCCH is sequentially processed by scrambling, modulation, and spreading or block-wise spreading, mapping to physical resources, OFDM baseband signal generation, modulation and upconversion to generate the first PUCCH.

As an embodiment, the technical feature "a bit block obtained by the first bit block through channel coding and a bit block obtained by the second bit block through channel coding are used together to generate the first PUCCH" in the claims includes the following operation: a bit block obtained by the first bit block through channel coding is sequentially subjected to rate matching and code block concatenation to generate a first target bit sequence, and a bit block obtained by the second bit block through channel coding is sequentially subjected to rate matching and code block concatenation to generate a second target bit sequence. A bit sequence obtained by multiplexing the first target bit sequence and the second target bit sequence to PUCCH is sequentially processed by scrambling, modulation, and spreading or block-wise spreading, mapping to physical resources, OFDM baseband signal generation, modulation and upconversion to generate the first PUCCH.

As an embodiment, the technical feature "the first bit block is used in channel coding" in the claims includes: the first bit block is directly input to a channel encoder.

As an embodiment, the technical feature "the first bit block is used in channel coding" in the claims includes: the first bit block is processed and input to a channel encoder.

As an embodiment, the technical feature "the first bit block is used in channel coding" in the claims includes: a UCI bit sequence is generated, a code block is segmented, and the first bit block the first bit block is attached to a CRC before being input to a channel encoder.

As an embodiment, the technical feature "the first bit block is used in channel coding" in the claims includes: the processed bits of the first bit block are coded through a channel.

As an embodiment, the technical feature "the first bit block is used in channel coding" in the claims includes: a UCI bit sequence is generated, a code block is segmented, and the first bit block the first bit block is attached to a CRC before being input to a channel encoder.

As an embodiment, the technical feature "the first bit block is used in channel coding" in the claims includes: a UCI bit sequence is generated, and the first bit block the first bit block is attached to a CRC before being input to a channel encoder.

As an embodiment, the technical feature "the first bit block is used in channel coding" in the claims includes: the first bit block is sequentially compressed or bundled, a UCI bit sequence is generated, and the first bit block is attached to a CRC before channel coding.

As an embodiment, the technical feature "the first bit block is used in channel coding" in the claims includes: the first bit block is sequentially compressed or bundled, a UCI bit sequence is generated, a code block is segmented, and the first bit block the first bit block is attached to a CRC before being input to a channel encoder.

As an embodiment, the technical feature "the second bit block is used in channel coding" in the claims includes: the second bit block is directly input to a channel encoder.

As an embodiment, the technical feature "the second bit block is used in channel coding" in the claims includes: the second bit block is processed and input to a channel encoder.

As an embodiment, the technical feature "the second bit block is used in channel coding" in the claims includes: a UCI bit sequence is generated, a code block is segmented, and the second bit block the first bit block is attached to a CRC before being input to a channel encoder.

As an embodiment, the technical feature "the second bit block is used in channel coding" in the claims includes: the processed bits of the second bit block are coded through a channel.

As an embodiment, the technical feature "the second bit block is used in channel coding" in the claims includes: a UCI bit sequence is generated, a code block is segmented, and the second bit block the first bit block is attached to a CRC before being input to a channel encoder.

As an embodiment, the technical feature "the second bit block is used in channel coding" in the claims includes: a UCI bit sequence is generated, and the second bit block is attached to a CRC before being input to a channel encoder.

As an embodiment, the technical feature "the second bit block is used in channel coding" in the claims includes: the second bit block is sequentially compressed or bundled, a UCI bit sequence is generated, and the second bit block the first bit block is attached to a CRC before being input to a channel encoder.

As an embodiment, the technical feature "the second bit block is used in channel coding" in the claims includes: the second bit block is sequentially compressed or bundled, a UCI bit sequence is generated, a code block is segmented, and the second bit block the first bit block is attached to a CRC before being input to a channel encoder.

As an embodiment, the bit block generated together with the first bit block and the second bit block is a bit block obtained by concatenating the bits in the first bit block and the bits in the second bit block.

As an embodiment, the bit block generated together with the first bit block and the second bit block is a bit block obtained by concatenating the bits in the first bit block and the bits in the third bit block in the present application.

As an embodiment, the bit block generated together with the first bit block and the second bit block is a bit block sequentially by concatenating the bits in the first bit block and the bits obtained after compression or bundling of the second bit block.

As an embodiment, the bit block generated together with the first bit block and the second bit block is the bit block obtained by concatenating the bits in the second bit block and the bits obtained after compression or bundling of the first bit block.

As an embodiment, the bit blocks generated together with the first bit block and the second bit block are the bit blocks generated through UCI bit sequences.

As an embodiment, the technical feature "bit blocks generated together with the first bit block and the second bit block are used in channel coding" in the claims includes the following operation: bit blocks generated together with the first bit block and the second bit block are directly input into the channel encoder.

As an embodiment, the technical feature "bit blocks generated together with the first bit block and the second bit block are used in channel coding" in the claims includes the following operation: bit blocks generated together with the first bit block and the second bit block are processed and input into the channel encoder.

As an embodiment, the technical feature "bit blocks generated together with the first bit block and the second bit block are used in channel coding" in the claims includes the following operation: bit blocks generated together with the first bit block and the second bit block are used in channel coding after passing UCI bit sequence generation, code block segmentation, and CRC attachment sequentially.

As an embodiment, the technical feature "bit blocks generated together with the first bit block and the second bit block are used in channel coding" in the claims includes the following operation: bit blocks generated together with the first bit block and the second bit block are used in channel coding after passing code block segmentation, and CRC attachment sequentially.

As an embodiment, the technical feature "bit blocks generated together with the first bit block and the second bit block are used in channel coding" in the claims includes the following operation: bit blocks generated together with the first bit block and the second bit block are used in channel coding after CRC attachment.

As an embodiment, in response to the target coding method being the second candidate method, the channel coding through which the first bit block and the second bit block are generated together includes polar coding.

As an embodiment, in response to the target coding method being the second candidate method, the channel coding through which the first bit block and the second bit block are generated together includes channel coding of small block lengths.

As an embodiment, in response to the target coding method being the second candidate method, the channel coding through which the first bit block and the second bit block are generated together includes RM coding.

As an embodiment, in response to the target coding method being the second candidate method, the first bit block and the second bit block generated together undergo CRC calculation before being input into the channel encoder.

As an embodiment, in response to the target coding method being the second candidate method, the first bit block and the second bit block generated together undergo CRC attachment before being input to the channel encoder.

As an embodiment, the technical feature "bit blocks generated together with the first bit block and the second bit block are used to generate the first PUCCH through channel coding" in the claims includes the following operation: the bit sequence obtained by the first bit block and the second bit block generated together through channel coding is sequentially processed by at least one of rate matching, code block concatenation multiplexing to PUCCH, scrambling, modulation, spreading or block wise spreading, transform precoding, mapping to physical resources, OFDM baseband signal generation, and at least one of modulation and upconversion to generate the first PUCCH.

As an embodiment, the technical feature "bit blocks generated together with the first bit block and the second bit block are used to generate the first PUCCH through channel coding" in the claims includes the following operation: the first bit block and the second bit block generated together are used by the first node device in the present application to generate the first PUCCH through channel coding.

As an embodiment, the technical feature "bit blocks generated together with the first bit block and the second bit block are used to generate the first PUCCH through channel coding" in the claims includes the following operation: the first bit block and the third bit block generated together in the present application are used by the first node device in the present application to generate the first PUCCH through channel coding.

As an embodiment, the first level index is a non-negative integer.

As an embodiment, the first level index is equal to one of 0 or 1.

As an embodiment, the first level index is a positive integer.

As an embodiment, the second level index is a non-negative integer.

As an embodiment, the second level index is equal to one of 0 or 1.

As an embodiment, the second level index is a positive integer.

As an embodiment, the first level index is greater than the second level index.

As an embodiment, the first level index is smaller than the second level index.

As an embodiment, the priority index of the HARQ-ACK bits in the first bit block is the priority index of the physical downlink shared channel (PDSCH) associated with the HARQ-ACK bits in the first bit block.

As an embodiment, the priority index of the HARQ-ACK bits in the first bit block is indicated by the DCI format carried by the PDCCH associated with the HARQ-ACK bits in the first bit block.

As an embodiment, the priority index of the HARQ-ACK bits in the first bit block is the value of the priority indicator carried by the PDCCH associated with the HARQ-ACK bits in the first bit block.

As an embodiment, the priority index of the HARQ-ACK bits in the second bit block is the priority index of the PDSCH associated with the HARQ-ACK bits in the second bit block.

As an embodiment, the priority index of the HARQ-ACK bits in the second bit block is indicated by the DCI format carried by the PDCCH associated with the HARQ-ACK bits in the second bit block.

As an embodiment, the priority index of the HARQ-ACK bits in the second bit block is the value of the priority indicator carried by the PDCCH associated with the HARQ-ACK bits in the second bit block.

As an embodiment, the first PUCCH corresponds to the first level index.

As an embodiment, the priority level index associated with the first PUCCH is equal to the first level index.

As an embodiment, the priority index indicated by the DCI format indicating the time-frequency resources occupied by the first PUCCH is equal to the first level index.

As an embodiment, the value of the priority indicator carried by the DCI format indicating the time-frequency resources occupied by the first PUCCH is equal to the first level index.

As an embodiment, the priority index indicated by the DCI format carrying the PUCCH resource indicator (PRI) for the first PUCCH is equal to the first level index.

As an embodiment, the value of the priority indicator carried in the DCI format of the PRI for the first PUCCH is equal to the first level index.

As an embodiment, the first PUCCH corresponds to the second level index.

As an embodiment, the priority index associated with the first PUCCH is equal to the second level index.

As an embodiment, the DCI format indicating the time-frequency resources occupied by the first PUCCH indicates a priority index equal to the second level index.

As an embodiment, the value of the priority indicator carried by the DCI format indicating the time-frequency resources occupied by the first PUCCH is equal to the second level index.

As an embodiment, the priority index indicated by the DCI format carrying the PRI for the second PUCCH is equal to the first level index.

As an embodiment, the value of the priority indicator carried in the DCI format of the PRI for the second PUCCH is equal to the first level index.

As an embodiment, the first PUCCH corresponds to a larger rank index compared between the first rank index and the second rank index.

As an embodiment, the priority index associated with the first PUCCH is equal to the larger rank index compared between the first rank index and the second rank index.

As an embodiment, the first PUCCH corresponds to a small rank index compared between the first rank index and the second rank index.

As an embodiment, the priority level index associated with the first PUCCH is equal to the smaller level index compared between the first level index and the second level index.

As an embodiment, the priority index indicated by the DCI format indicating the time-frequency resources occupied by the first PUCCH is equal to the larger level index compared between the first level index and the second level index.

As an embodiment, the value of the Priority indicator carried by the DCI format indicating the time-frequency resources occupied by the first PUCCH is equal to the larger level index compared between the first level index and the second level index.

As an embodiment, the priority index indicated by the DCI format of the PRI for the first PUCCH is equal to the larger level index compared between the first level index and the second level index.

As an embodiment, the value of the priority indicator carried in the DCI format of the PRI for the first PUCCH is equal to the larger level index compared between the first level index and the second level index.

As an embodiment, the priority index indicated by the DCI format indicating the time-frequency resources occupied by the first PUCCH is equal to the smaller level index compared between the first level index and the second level index.

As an embodiment, the value of the priority indicator carried by the DCI format indicating the time-frequency resources occupied by the first PUCCH is equal to the smaller level index compared between the first level index and the second level index.

As an embodiment, the priority index indicated by the DCI format of the PRI for the first PUCCH is equal to the smaller level index compared between the first level index and the second level index.

As an embodiment, the value of the Priority indicator carried in the DCI format of the PRI for the first PUCCH is equal to the smaller level index compared between the first level index and the second level index.

Second Embodiment

Figure 2:
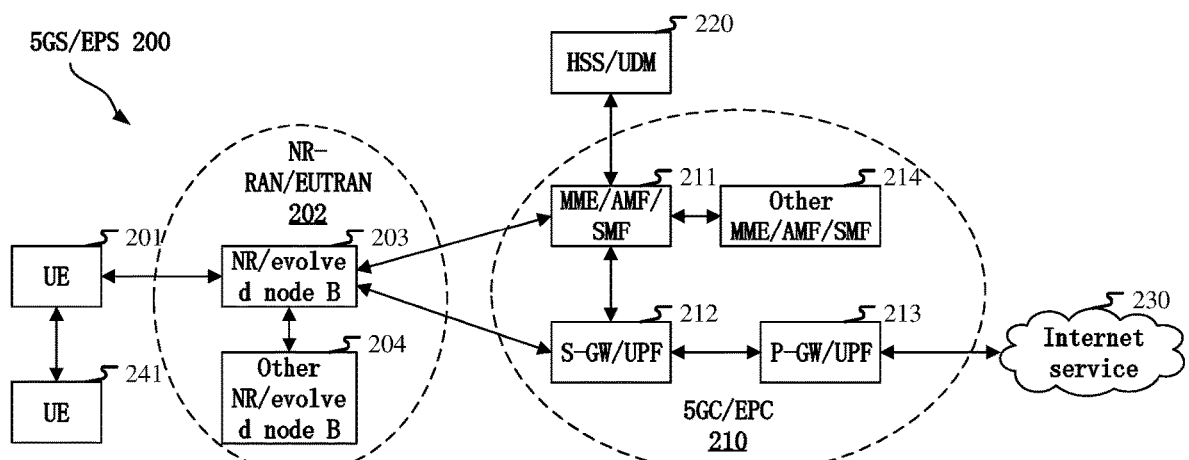
FIG. 2 is a schematic diagram of a network architecture according to another embodiment of the present application.

The second embodiment illustrates a schematic diagram of a network architecture according to the present application, as shown in FIG. 2. FIG. 2 illustrates the network architecture 200 of 5G NR, long term evolution (LTE), and LTE-Advanced (LTE-A) systems. Reference for 5G NR or LTE network architecture 200 can be made to as 5G system (5GS)/evolved packet system (EPS) 200 or some other suitable term. The 5GS/EPS 200 includes one or more user equipment (UE) 201, a next generation radio access network (NG-RAN) 202, 5G core network (5GC)/evolved packet core (EPC) 210, home subscriber server (HSS)/unified data management (UDM) 220, and internet services 230. 5GS/EPS can be interconnected with other access networks, but these entities/interfaces are not shown for simplicity. As shown in the figure, 5GS/EPS provides packet switching services, but those skilled in the field will easily understand that the various concepts presented throughout the present application can be extended to networks or other cellular networks that provide circuit switching services. NG-RAN includes NR/Evolution Node B (gNB/eNB) 203 and other gNB (eNB) 204. GNB (eNB) 203 provides termination of user and control plane protocols towards UE 201. GNB (eNB) 203 can be connected to other gNB (eNB) 204 through $X_n/X_2$ interfaces (such as backhaul). GNB (eNB) 203 can also be referred to as a base station, base transceiver, radio base station, transceiver, transceiver function, basic service set (BSS), extended service set (ESS), transmitter receiver point (TRP), or some other suitable term. GNB (eNB) 203 provides UE 201 with an access point to 5GC/EPC210. The UE 201 is embodied as cellular phones, smartphones, session initiation protocol (SIP) phones, laptops, personal digital assistant (PDA), satellite radios, non terrestrial base station communication, satellite mobile communication, global positioning systems, multimedia devices, video devices, digital audio players (e.g., MP3 players), cameras, game consoles, drones aircraft, narrowband IoT devices, machine type communication devices, land transportation vehicles, automobiles, wearable devices, testing equipment, testing instruments, testing tools, or any other similar functional devices. Those skilled in the art may also refer to the UE 201 as a mobile station, subscriber station, mobile unit, subscriber unit, wireless unit, remote unit, mobile device, wireless device, wireless communication device, remote device, mobile subscriber station, access terminal, mobile terminal, wireless terminal, remote terminal, handheld device, user agent, mobile client, client, or some other suitable term. GNB (eNB) 203 is connected to 5GC/EPC210 through S1/NG interface. 5GC/EPC210 includes mobility management entity (MME)/authentication management field (AMF)/session management function (SMF) 211, other MME/AMF/SMF214, service gateway (S-GW)/user plane function (UPF) 212, and packet date network gateway (P-GW)/UPF213. MME/AMF/SMF211 is the control node that handles signaling between UE 201 and 5GC/EPC210. Overall, MME/AMF/SMF211 provides bearer and connection management. All user internet protocol (IP) packets are transmitted through S-GW/UPF212, which connects itself to P-GW/UPF213. P-GW provides UE IP address allocation and other functions. P-GW/UPF213 connects to Internet service 230. Internet service 230 includes operator specific Internet protocol services, which can include the Internet, Intranet, IP multimedia subsystem (IMS), and packet switching streaming services.

As an embodiment, the UE 201 corresponds to the first node device in the present application.

As an embodiment, the UE 201 supports multiplexing transmission of UCIs with different priority levels.

As an embodiment, the gNB (eNB) 201 corresponds to the second node device in the present application.

As an embodiment, the gNB (eNB) 201 supports multiplexing transmission of UCIs with different priority levels.

Third Embodiment

Figure 3:
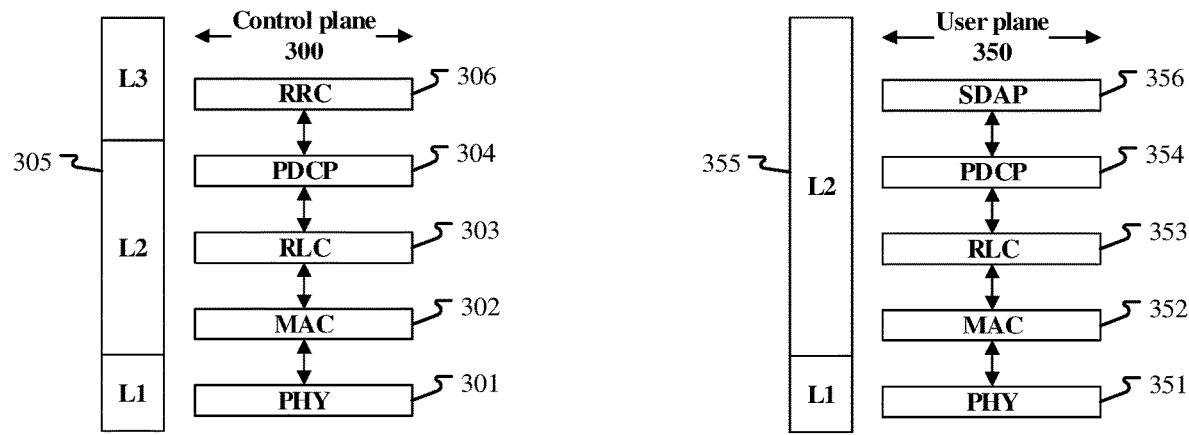
FIG. 3 is a schematic diagram of a wireless protocol architecture of a user plane and a control plane according to yet another embodiment of the present application.

The third embodiment illustrates a schematic diagram of a wireless protocol architecture based on a user plane and a control plane according to the present application, as shown in FIG. 3. FIG. 3 is a schematic diagram of the radio protocol architecture for a user plane 350 and a control plane 300 according to an embodiment. FIG. 3 shows a radio protocol architecture for the control plane 300 for the first node device (UE or gNB) and the second node device (gNB or UE) in three layers: layer 1, layer 2, and layer 3. Layer 1 (L1 layer) is the lowest layer and implements various PHY signal processing functions. The L1 layer will be referred to as PHY 301 hereinafter. Layer 2 (L2 layer) 305 is arranged above the PHY 301 and is configured to implement the link between the first node device and the second node device through the PHY 301. The L2 layer 305 includes a MAC sublayer 302, a radio link control protocol (RLC) sublayer 303, and a packet data convergence protocol (PDCP) sublayer 304, which terminate at the second node device. The PDCP sublayer 304 is configured to provide multiplexing between different radio carriers and logical channels. The PDCP sublayer 304 is further configured to provide security by encrypting data packets, as well as cross zone mobility support for the first node device between the second node devices. The RLC sublayer 303 is configured to provide segmentation and reassembly of upper layer data packets, retransmission of lost data packets, and reordering of data packets to compensate for disorderly reception caused by HARQ. The MAC sublayer 302 is configured to provide multiplexing between logic channel and transmission channel. The MAC sublayer 302 is further configured to allocate various radio resources (e.g., resource blocks) in a cell between the first node devices. The MAC sublayer 302 is further configured to implement HARQ operations. The RRC sub layer 306 in layer 3 (L3 layer) of control plane 300 is configured to obtain radio resources (i.e., radio bearer) and configure the lower layer using RRC signaling between the second node device and the first node device. The radio protocol architecture of user plane 350 includes layer 1 (L1 layer) and layer 2 (L2 layer). The radio protocol architecture used for the first and second node devices in user plane 350 is generally the same as the corresponding layers and sublayers in the control plane 300 for the physical layer 351, the PDCP sublayer 354 in L2 layer 355, the RLC sublayer 353 in L2 layer 355, and the MAC sublayer 352 in L2 layer 355. The PDCP sublayer 354 is further configured to provide header compression for upper layer packets to reduce radio transmission overhead. The L2 layer 355 in the user plane 350 further includes the service data adaptation protocol (SDAP) sublayer 356 configured to implement mapping between QoS flows and data radio bearer (DRB) to support business diversity. Although not shown, the first node device may have several upper layers above L2 layer 355, including a network layer terminated at P-GW on the network side (e.g., IP layer) and an application layer terminated at the other end of the connection (e.g., remote UE, server, etc.).

As an embodiment, the wireless protocol architecture in FIG. 3 is applicable to the first node device in the present application.

As an embodiment, the wireless protocol architecture in FIG. 3 is applicable to the second node device in the present application.

As an embodiment, the first information block in the present application is generated from the RRC 306, the MAC 302, the MAC 352, or the PHY 301, or the PHY 351.

As an embodiment, the first PUCCH in the present application is generated on either the PHY 301 or the PHY 351.

As an embodiment, the first information block in the present application is generated on either the PHY 301 or the PHY 351.

As an embodiment, the second information block in the present application is generated from the RRC 306, the MAC 302, the MAC 352, the PHY 301, or the PHY 351.

As an embodiment, the third information block in the present application is generated from the RRC 306, the MAC 302, the MAC 352, the PHY 301, or the PHY 351.

Fourth Embodiment

Figure 4:
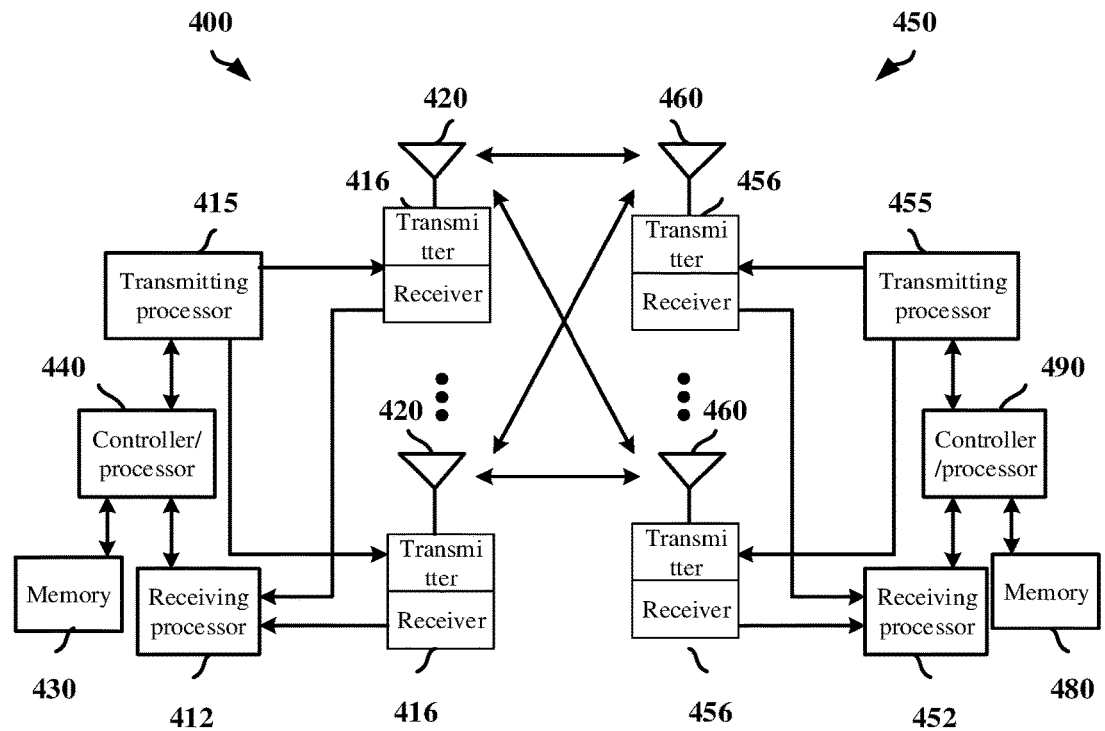
FIG. 4 is a schematic diagram of a first node device and a second node device according to still another embodiment of the present application.

The fourth embodiment illustrates a schematic diagram of the first node device and the second node device according to an embodiment of the present application, as shown in FIG. 4.

The first node device (450) includes a controller/processor 490, a data source/buffer 480, a receiving processor 452, a transmitter/receiver 456, and a transmitting processor 455. The transmitter/receiver 456 includes an antenna 460.

The second node device (410) includes a controller/processor 440, a data source/buffer 430, a receiving processor 412, a transmitter/receiver 416, and a transmitting processor 415. The transmitter/receiver 416 includes an antenna 420.

In DL, upper layer packets, such as the upper layer information carried by the first and second information blocks in the present application (in response to the first information block including upper layer information), are provided to the controller/processor 440. The controller/processor 440 is configured to implement the functions of L2 layer and above. In DL, the controller/processor 440 is configured to provide packet header compression, encryption, packet segmentation and reordering, multiplexing between logic channel and transport channel, and radio resource allocation to first node device 450 based on various priority metrics. The controller/processor 440 is further configured to implement HARQ operations, retransmission of lost packets, and signaling to the first node device 450. For example, the high-level information in the first and second information blocks in the present application (when the first information block includes high-level information) is generated in the controller/processor 440. The transmitting processor 415 is configured to implement various signal processing functions for the L1 layer (i.e., the physical layer), including coding, interleaving, scrambling, modulation, power control/allocation, precoding, and physical layer control signaling generation. For example, the generation of physical layer signals carrying the first and second information blocks is completed by the transmitting processor 415. The generated modulation symbols are divided into parallel streams and mapped to corresponding multi-carrier subcarriers and/or multi-carrier symbols, which are then transmitted in the form of radio frequency signals by the transmitting processor 415 via the transmitter 416 to the antenna 420. At the receiving end, each receiver 456 receives an RF signal through its corresponding antenna 460, and each receiver 456 restores the baseband information modulated onto the RF carrier and provides the baseband information to the receiving processor 452. The receiving processor 452 is configured to implement various signal reception and processing functions of the L1 layer. The signal reception and processing function includes receiving the physical layer signal carrying the first information block and the physical layer signal carrying the second information block in the present application, demodulating based on various modulation schemes (e.g., binary phase shift keying (BPSK) and quadrature phase shift keying (QPSK)) through the multi carrier symbols in the multi carrier symbol stream, and then descrambling, decoding and deinterleaving to recover data or control transmitted by the second node device 410 on the physical channel, followed by providing the data and control signals to the controller/processor 490. The controller/processor 490 is responsible for the L2 layer and above. The controller/processor 490 is configured to interpret the high-level information contained in the first information block of the present application (in response to the first information block including high-level information) and the high-level information carried by the second information block. The controller/processor can be associated with a memory 480 that stores program code and data. The memory 480 can be referred to as a computer readable medium.

In uplink (UL) transmission, similar to downlink transmission, the high-level information includes the third information block in the present application, which is generated by the controller/processor 490 and implemented by the transmitting processor 455 for various signal transmission processing functions in the L1 layer (i.e., the physical layer). The first PUCCH and the physical layer signal carrying the third information block in the present application are generated by the transmitting processor 455, After that, the transmitting processor 455 is configured to map to the antenna 460 through the transmitter 456 and transmits it in the form of an RF signal. The receiver 416 is configured to receive radio frequency signals through its corresponding antenna 420, restore the baseband information modulated onto the radio frequency carrier, and provide the baseband information to the receiving processor 412. The receiving processor 412 is configured to implement various signal reception and processing functions for the L1 layer (i.e., the physical layer), which includes receiving and processing the first PUCCH and physical layer signals carrying the third information block in the present application, and then providing data and/or control signals to the controller/processor 440. The controller/processor 440 is configured to implement L2 layer functions, which includes interpreting high-level information such as the third information block in the present application. The controller/processor can be associated with a buffer 430 configured to store program code and data. The buffer 430 can be a computer-readable medium.

As an embodiment, the first node device 450 device includes: at least one processor and at least one memory, where the at least one memory includes computer program code. The at least one memory and the computer program code are configured to be used with the at least one processor, and the first node device 450 device is at least configured to receive a first information block, and transmit a first PUCCH, where the first bit block and the second bit block are used to generate the first PUCCH through the target coding method. The first bit block includes at least one HARQ-ACK bit, and the second bit block includes at least one HARQ-ACK bit. The target coding method is one of the first candidate method or the second candidate method, and the first information block is used to determine the target coding method from the first candidate method and the second candidate method. In response to the target coding method being the first candidate method, a bit block obtained by the first bit block through channel coding and a bit block obtained by the second bit block through channel coding are used together to generate the first PUCCH. In response to the target coding method being the second candidate method, the bit blocks generated together with the first bit block and the second bit block are used to generate the first PUCCH through channel coding. The priority index of the HARQ-ACK bits in the first bit block is equal to the first level index, and the priority index of the HARQ-ACK bits in the second bit block is equal to the second level index. The first level index and the second level index are not equal.

As an embodiment, the first node device 450 device includes: a memory for storing a computer readable instruction program, where the computer readable instruction program generates an action when executed by the at least one processor. The action includes receiving a first information block, transmitting a first PUCCH, where the first bit block and the second bit block are used to generate the first PUCCH through the target coding method. The first bit block includes at least one HARQ-ACK bit, and the second bit block includes at least one HARQ-ACK bit. Among them, the target coding method is one of the first candidate method or the second candidate method, and the first information block is used to determine the target coding method from the first candidate method and the second candidate method. In response to the target coding method being the first candidate method, a bit block obtained by the first bit block through channel coding and a bit block obtained by the second bit block through channel coding are used together to generate the first PUCCH. In response to the target coding method being the second candidate method, the bit blocks generated together with the first bit block and the second bit block are used to generate the first PUCCH through channel coding. The priority index of the HARQ-ACK bits in the first bit block is equal to the first level index, and the priority index of the HARQ-ACK bits in the second bit block is equal to the second level index. The first level index and the second level index are not equal.

As an embodiment, the second node device 410 device includes: at least one processor and at least one memory, where the at least one memory includes computer program code. The at least one memory and the computer program code are configured to be used together with the at least one processor. The second node device 410 device is at least configured to transmit a first information block, and receive a first PUCCH. The first bit block and the second bit block are used to generate the first PUCCH through the target coding method, the first bit block includes at least one HARQ-ACK bit, and the second bit block includes at least one HARQ-ACK bit. Among them, the target coding method is one of the first candidate method or the second candidate method, and the first information block is used to indicate the target coding method from the first candidate method and the second candidate method. In response to the target coding method being the first candidate method, a bit block obtained by the first bit block through channel coding and a bit block obtained by the second bit block through channel coding are used together to generate the first PUCCH. In response to the target coding method being the second candidate method, the bit blocks generated together with the first bit block and the second bit block are used to generate the first PUCCH through channel coding. The priority index of the HARQ-ACK bits in the first bit block is equal to the first level index, and the priority index of the HARQ-ACK bits in the second bit block is equal to the second level index. The first level index and the second level index are not equal.

As an embodiment, the second node device 410 includes a memory for storing a computer readable instruction program, which generates an action when executed by at least one processor. The action includes: transmitting a first information block, and receiving a first PUCCH. The first bit block and the second bit block are used to generate the first PUCCH through the target coding method, the first bit block includes at least one HARQ-ACK bit, and the second bit block includes at least one HARQ-ACK bit. Among them, the target coding method is one of the first candidate method or the second candidate method, and the first information block is used to indicate the target coding method from the first candidate method and the second candidate method. In response to the target coding method being the first candidate method, a bit block obtained by the first bit block through channel coding and a bit block obtained by the second bit block through channel coding are used together to generate the first PUCCH. In response to the target coding method being the second candidate method, the bit blocks generated together with the first bit block and the second bit block are used to generate the first PUCCH through channel coding. The priority index of the HARQ-ACK bits in the first bit block is equal to the first level index, and the priority index of the HARQ-ACK bits in the second bit block is equal to the second level index. The first level index and the second level index are not equal.

As an embodiment, the first node device 450 is a UE.

As an embodiment, the first node device 450 is a user device configured to support information multiplexing transmission with different priority levels.

As an embodiment, the second node device 410 is a base station device (gNB/eNB).

As an embodiment, the second node device 410 is a base station device configured to support information multiplexing transmission with different priority levels.

As an embodiment, the receiver 456 (including the antenna 460) and the receiving processor 452 are used to receive the first information block in the present application.

As an embodiment, the receiver 456 (including the antenna 460), the receiving processor 452, and the controller/processor 490 are used to receive the first information block in the present application.

As an embodiment, the transmitter 456 (including the antenna 460) and the transmitting processor 455 are used to transmit the first PUCCH in the present application.

As an embodiment, the receiver 456 (including the antenna 460), the receiving processor 452, and the controller/processor 490 are used to receive the second information block in the present application.

As an embodiment, the transmitter 456 (including the antenna 460), the transmitting processor 455, and the controller/processor 490 are used to transmit the third information block in the present application.

As an embodiment, the transmitter 416 (including the antenna 420) and the transmitting processor 415 are used to transmit the first information block in the present application.

As an embodiment, the transmitter 416 (including the antenna 420), transmitting processor 415, and controller/processor 440 are used to transmit the first information block in the present application.

As an embodiment, the receiver 416 (including the antenna 420) and the receiving processor 412 are used to receive the first PUCCH in the present application.

As an embodiment, the transmitter 416 (including the antenna 420), the transmitting processor 415, and the controller/processor 440 are used to transmit the second information block in the present application.

As an embodiment, the receiver 416 (including the antenna 420), the receiving processor 412, and the controller/processor 440 are used to receive the third information block in the present application.

Fifth Embodiment

Figure 5:
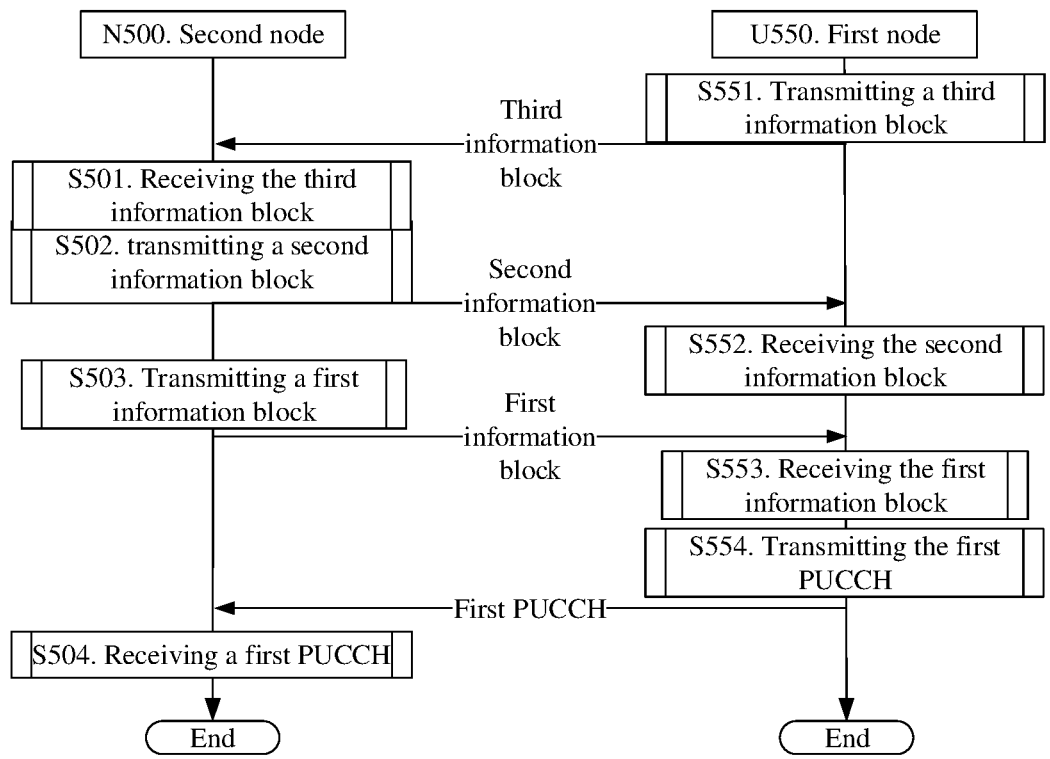
FIG. 5 is a wireless signal transmission flowchart according to still another embodiment of the present application.

The fifth embodiment illustrates a wireless signal transmission flowchart according to an embodiment of the present application, as shown in FIG. 5. In FIG. 5, the second node device N500 is a maintenance base station of a service cell of a first node device U550. It should be noted that the order in this embodiment does not limit the order of signal transmission and implementation in the present application.

For a second node device N500, a third information block is received in an operation S501, a second information block is sent in an operation S502, a first information block is sent in an operation S503, and a first PUCCH is received in an operation S504.

For the first node device U550, the third information block is sent in an operation S551, the second information block is received in an operation S552, the first information block is received in an operation S553, and the first PUCCH is sent in an operation S554.

In the fifth embodiment 5, the first bit block and the second bit block are used to generate the first PUCCH through the target coding method, where the first bit block includes at least one HARQ-ACK bit, and the second bit block includes at least one HARQ-ACK bit. The target coding method is one of the first candidate method or the second candidate method, and the first information block is used to determine the target coding method from the first candidate method and the second candidate method. In response to the target coding method being the first candidate method, a bit block obtained by the first bit block through channel coding and a bit block obtained by the second bit block through channel coding are used together to generate the first PUCCH. In response to the target coding method being the second candidate method, the bit blocks generated together with the first bit block and the second bit block are used to generate the first PUCCH through channel coding. The priority index of the HARQ-ACK bits in the first bit block is equal to the first level index, and the priority index of the HARQ-ACK bits in the second bit block is equal to the second level index. The first level index and the second level index are not equal. The second information block is used to determine whether the DCI format carried by the first PDCCH includes the first information block or not. The third information block is used to indicate that the first node device supports HARQ-ACK bit multiplexing with different priority levels.

As an embodiment, the second information block is transmitted through an air interface or wireless interface.

As an embodiment, the second information block includes all or part of a high-level signaling or physical layer signaling.

As an embodiment, the second information block includes all or part of an RRC layer signaling or MAC layer signaling.

As an embodiment, the second information block includes all or part of a SIB.

As an embodiment, the second information block is cell specific or UE specific.

As an embodiment, the second information block is configured per BWP.

As an embodiment, the second information block includes all or part of a DCI signaling field.

As an embodiment, the second information block includes a priority indication domain in a DCI format.

As an embodiment, the first information block and the second information block are two different IEs in the same RRC layer signaling.

As an embodiment, the first information block and the second information block are two different domains in the same IE.

As an embodiment, the first information block and the second information block are two different domains in the same DCI format.

As an embodiment, the second information block includes more than one sub information block, and each sub information block in the first information block is an IE or a field in the RRC signaling to which the second information block belongs. One or more sub information blocks in the second information block are used to determine whether the DCI format carried by the first PDCCH includes the first information block or not.

As an embodiment, the second information block includes all or part of the fields in IE "PUCCH-Config" in an RRC signaling.

As an embodiment, the second information block includes all or part of the fields in IE "PDSCH-Config" in an RRC signaling.

As an embodiment, the second information block includes all or part of the fields in the IE "PUCCH-ConfigCommon" in an RRC signaling.

As an embodiment, the second information block includes all or part of the fields in the IE "BWP-UplinkDedicated" in an RRC signaling.

As an embodiment, the second information block includes all or part of the fields in the IE "pucch-Configuration List" in an RRC signaling.

As an embodiment, the second information block includes all or part of the fields in the second "PUCCH-Config" IE in the IE "pucch-ConfigurationList" of an RRC signaling.

As an embodiment, the second information block includes all or part of the fields in the "PUCCH-Config" IE with a corresponding priority index of "1" in the IE "pucch-ConfigurationList" in an RRC signaling.

As an embodiment, the second information block includes all or part of the fields in the "PUCCH-Config" IE with a corresponding priority index of "0" in the IE "pucch-ConfigurationList" in an RRC signaling.

As an embodiment, the second information block includes all or part of the fields in the IE "PUCCH-Config" corresponding to a large priority index in the IE "pucch-Configuration List" in an RRC signaling.

As an embodiment, the second information block includes all or part of the fields (Fields) in the IE "PUCCH-Config" corresponding to a small priority index in the IE "pucch-Configuration List" in an RRC signaling.

As an embodiment, the technical feature "the second information block is used to determine that a DCI format carried by the first PDCCH includes the first information block" in the claims includes the following operation: the second information block is used by the first node device in the present application to determine whether the DCI format carried by the first PDCCH includes the first information block or not.

As an embodiment, the technical feature "the second information block is used to determine that a DCI format carried by the first PDCCH includes the first information block" in the claims includes the following operation: the second information block is used to explicitly or implicitly indicate that the DCI format carried by the first PDCCH includes the first information block.

As an embodiment, the technical feature "the second information block is used to determine that a DCI format carried by the first PDCCH includes the first information block" in the claims includes the following operation: the second information block is used to determine whether the DCI format carried by the first PDCCH includes a domain indicating the first information block or not.

As an embodiment, the technical feature "the second information block is used to determine that a DCI format carried by the first PDCCH includes the first information block" in the claims includes the following operation: the second information block is used to determine whether the target DCI format includes a first domain, and the DCI format carried by the first PDCCH is the target DCI format, and the first domain indicates the first information block.

As an embodiment, the technical feature "the second information block is used to determine that a DCI format carried by the first PDCCH includes the first information block" in the claims includes the following operation: the second information block is used to determine that the target DCI format includes the first domain, and the first node device assumes that the DCI format carried by the first PDCCH is the target DCI format in response to the first PDCCH being received. The first domain indicates the first information block.

As an embodiment, the technical feature "the second information block is used to determine that a DCI format carried by the first PDCCH includes the first information block" in the claims includes the following operation: the second information block is used to determine that the DCI format carried by the first PDCCH includes a domain indicating the target coding method from the first candidate method and the second candidate method.

As an embodiment, the technical feature "the second information block is used to determine that a DCI format carried by the first PDCCH includes the first information block" in the claims includes the following operation: the second information block is used to determine that the first bit block and the second bit block are multiplexed together into the first PUCCH. The first bit block and the second bit block are multiplexed together into the first PUCCH to determine whether the DCI format carried by the first PDCCH includes the first information block or not.

As an embodiment, the technical feature "the second information block is used to determine that a DCI format carried by the first PDCCH includes the first information block" in the claims includes the following operation: the second information block is used to indicate that HARQ-ACK bits with different priority levels are multiplexed into the same PUCCH. The HARQ-ACK bits with different priority levels are multiplexed into the same PUCCH to determine whether the DCI format carried by the first PDCCH includes the first information block or not.

As an embodiment, the second information block is used to determine whether the first bit block and the second bit block are multiplexed together into the first PUCCH or not.

As an embodiment, the second information block is used to indicate that the HARQ-ACK bits with different priority levels are multiplexed into the same PUCCH.

Sixth Embodiment

Figure 6:
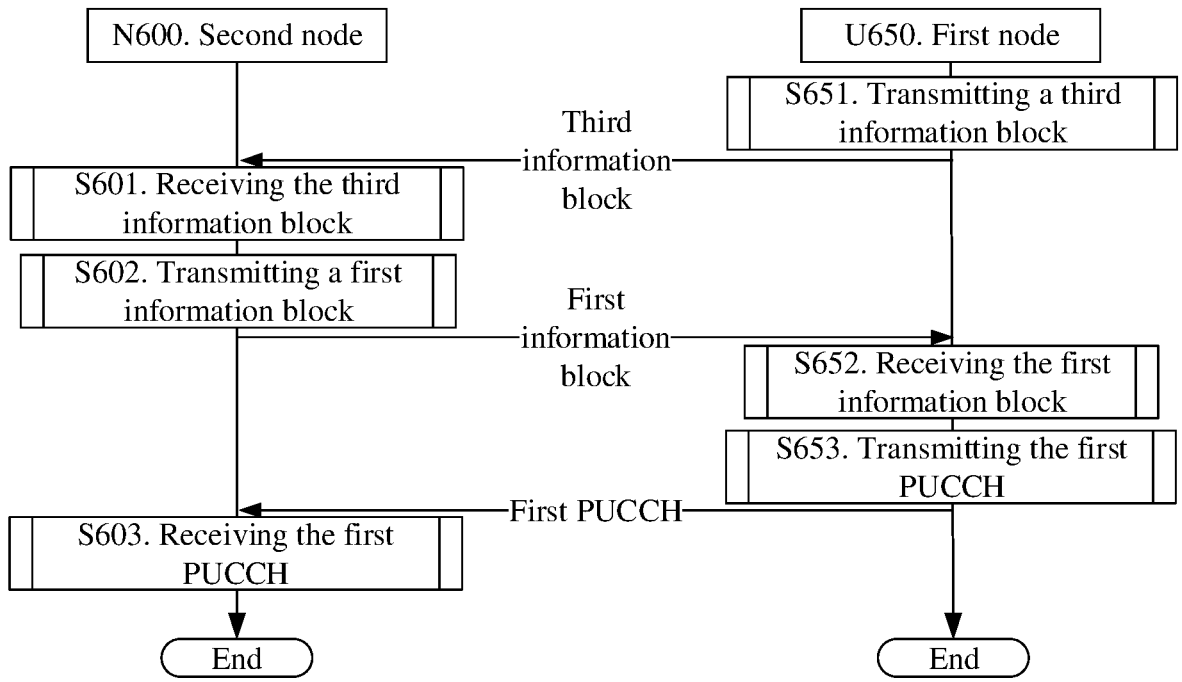
FIG. 6 is a wireless signal transmission flowchart according to still another embodiment of the present application.

The sixth embodiment illustrates a wireless signal transmission flowchart according to another embodiment of the present application, as shown in FIG. 6. In FIG. 6, a second node device N600 is a maintenance base station of a service cell of a first node device U650. It should be noted that the order in this embodiment does not limit the order of signal transmission and implementation in the present application.

For the second node device N600, a third information block is received in an operation S601, a first information block is sent in an operation S602, and a first PUCCH is received in an operation S603.

For the first node device U650, the third information block is sent in an operation S651, the first information block is received in an operation S652, and the first PUCCH is sent in an operation S653.

In the sixth embodiment, the first bit block and the second bit block are used to generate the first PUCCH through the target coding method, where the first bit block includes at least one HARQ-ACK bit, and the second bit block includes at least one HARQ-ACK bit. The target coding method is one of the first candidate method or the second candidate method, and the first information block is used to determine the target coding method from the first candidate method and the second candidate method. In response to the target coding method being the first candidate method, a bit block obtained by the first bit block through channel coding and a bit block obtained by the second bit block through channel coding are used together to generate the first PUCCH. In response to the target coding method being the second candidate method, the bit blocks generated together with the first bit block and the second bit block are used to generate the first PUCCH through channel coding. The priority index of the HARQ-ACK bits in the first bit block is equal to the first level index, and the priority index of the HARQ-ACK bits in the second bit block is equal to the second level index. The first level index and the second level index are not equal. The third information block is used to indicate that the first node device supports the HARQ-ACK bit multiplexing with different priority levels.

As an embodiment, the third information block is transmitted through an air interface or wireless interface.

As an embodiment, the third information block includes all or part of high-level signaling or physical layer signaling.

As an embodiment, the third information block includes all or part of RRC signaling.

As an embodiment, the third information block includes all or part of the MAC layer signaling.

As an embodiment, the third information block is transmitted through a PUSCH.

As an embodiment, the third information block is transmitted through a PUCCH.

As an embodiment, the third information block includes an UCI.

As an embodiment, the third information block is used to indicate the capability of the first node device in the present application.

As an embodiment, the third information block includes one or more fields in IE "Phy-Parameters".

As an embodiment, the technical feature "the third information block is used to indicate that the first node device supports HARQ-ACK bit multiplexing with different priority levels" in the claims includes the following operation: the third information block is used by the first node device in the present application to indicate that the first node device supports different priority levels of HARQ-ACK bit multiplexing.

As an embodiment, the technical feature "the third information block is used to indicate that the first node device supports HARQ-ACK bit multiplexing with different priority levels" in the claims includes the following operation: the third information block is used to indicate that the first node device supports HARQ-ACK bit multiplexing with different priority levels into the same PUCCH.

As an embodiment, the technical feature "the third information block is used to indicate that the first node device supports HARQ-ACK bit multiplexing with different priority levels" in the claims includes the following operation: the third information block is used to indicate that the first node device supports the same PUCCH to carry HARQ-ACK bits with different priority levels.

As an embodiment, the technical feature "the third information block is used to indicate that the first node device supports HARQ-ACK bit multiplexing with different priority levels" in the claims includes the following operation: the third information block is used to indicate that the first node device supports the same PUSCH carrying HARQ-ACK bits with different priority levels.

As an embodiment, the technical feature "the third information block is used to indicate that the first node device supports HARQ-ACK bit multiplexing with different priority levels" in the claims includes the following operation: the third information block is used to indicate that the first node device supports HARQ-ACK bit multiplexing with different priority levels onto the same PUSCH.

As an embodiment, the technical feature "the third information block is used to indicate that the first node device supports HARQ-ACK bit multiplexing with different priority levels" in the claims includes the following operation: the third information block is used to indicate that the first node device supports the first bit block and the second bit block for multiplexing into the first PUCCH.

Seventh Embodiment

The seventh embodiment illustrates a schematic diagram of the first information block according to an embodiment of the present application, as shown in FIG. 7. In FIG. 7, the first row from top to bottom represents possible bit states of the bits in the first information block, and the second row represents the information indicated by the corresponding bit states.

In the seventh embodiment, the first information block in the present application is used to determine whether the first bit block and the second bit block in the present application are multiplexed together into the first PUCCH or not in the present application.

As an embodiment, the technical feature "the first information block is used to determine that the first bit block and the second bit block are multiplexed together into the first PUCCH" in the claims includes the following operation: the first information block is used by the first node in the present application to determine whether the first bit block and the second bit block are multiplexed together into the first PUCCH or not.

As an embodiment, HARQ-ACK multiplexing instructions and coding method instructions are joint coded, which can provide flexible configuration of coding methods without increasing signaling overhead.

As an embodiment, the technical feature "the first information block is used to determine that the first bit block and the second bit block are multiplexed together into the first PUCCH" in the claims includes the following operation: the first information block is used to explicitly or implicitly indicate that the first bit block and the second bit block are multiplexed together into the first PUCCH.

As an embodiment, the technical feature "the first information block is used to determine that the first bit block and the second bit block are multiplexed together into the first PUCCH" in the claims includes the following operation: the first information block is used to enable the first bit block and the second bit block to be multiplexed together into the first PUCCH.

As an embodiment, the technical feature "the first information block is used to determine that the first bit block and the second bit block are multiplexed together into the first PUCCH" in the claims includes the following operation: the first information block is used to enable or switch on the multiplexing of HARQ-ACK bits with different priority levels into the same PUCCH.

As an embodiment, the technical feature "the first information block is used to determine that the first bit block and the second bit block are multiplexed together into the first PUCCH" in the claims includes the following operation: the first information block is used to enable or switch on a PUCCH or PUSCH carrying HARQ-ACK bits with different priority levels.

As an embodiment, the first information block includes a first sub information block and a second sub information block, where the first sub information block is used to indicate that the first information block is used to determine that the first bit block and the second bit block are multiplexed together into the first PUCCH, and the second sub information block is used to indicate the target coding method from the first candidate method and the second candidate method.

As an embodiment, the first information block includes a first sub information block and a second sub information block, where the first sub information block is used to indicate that the first information block is used to determine that the first bit block and the second bit block are multiplexed together into the first PUCCH, and the second sub information block is used to indicate the target coding method from the first candidate method and the second candidate method. The first sub information block is used to determine whether the first information block includes the second sub information block or not.

As an embodiment, the first information block is a choice, and the first information block is used to indicate that the first bit block and the second bit block are multiplexed together into the first PUCCH. The first information block includes a sequence of sub information blocks, one of which is used to indicate the target coding method from the first candidate method and the second candidate method.

As an embodiment, the first information block is a first choice in a field, and the domain to which the first information block belongs also includes a second choice. The first choice and the second choice are different. The first selection is used to indicate that the first bit block and the second bit block are multiplexed together into the first PUCCH. The first selection includes a sequence of sub information blocks, one of which is used to indicate the target coding method from the first candidate method and the second candidate method. As a subsidiary embodiment of the above embodiment, the second selection is used to indicate that the first bit block and the second bit block cannot be multiplexed together into the first PUCCH. As a subsidiary embodiment of the above embodiment, the second selection is used to enable or switch on a PUCCH or PUSCH carrying HARQ-ACK bits with different priority levels. As a subsidiary embodiment of the above embodiment, the second selection does not include a sequence of sub information blocks. As a subsidiary embodiment of the above embodiment, the second choice only includes NULL. As a subsidiary embodiment of the above embodiment, the domain to which the first information block belongs is the domain in the RRC layer signaling. As a subsidiary embodiment of the above embodiment, the domain to which the first information block belongs is the domain in "PUCCH-Config" IE. As a subsidiary embodiment of the above embodiment, the domain to which the first information block belongs is the domain in "PDSCH-Config" IE.

As an embodiment, the first information block includes a priority indicator.

As an embodiment, the first information block is used to determine whether the priority index of the first PUCCH or not.

As an embodiment, the first information block is used to determine the priority level indication value in the DCI format carried by the PDCCH associated with the first PUCCH.

As an embodiment, the first information block is used to indicate a first candidate value, which is one of the H1 candidate values, and H1 is a positive integer greater than 1. One of the H1 candidate values is used to simultaneously indicate that the value indicated by a priority level is equal to 1, the first bit block and the second bit block are multiplexed together into the first PUCCH, and the target coding method is the first candidate method. One of the H1 candidate values is used to simultaneously indicate that the value indicated by a priority level is equal to 1, the first bit block and the second bit block are multiplexed together into the first PUCCH, and the target coding method is the second candidate method. One of the H1 candidate values is used to indicate a priority level indication with a value equal to 0. One of the H1 candidate values is used to simultaneously indicate that the value indicated by a priority level is equal to 1, and that the first bit block and the second bit block cannot be multiplexed together into the first PUCCH.

As an embodiment, the first information block is a domain shared by priority level indication, HARQ-ACK bit multiplexing indication with different priority levels, separate coding, and joint coding indication.

As an embodiment, the first information block is a domain obtained through joint coding of priority level indication, HARQ-ACK bit multiplexing indication with different priority levels, separate coding, and joint coding indication.

As an embodiment, the first information block is obtained by re-interpreting the domain indicated by the priority level.

As an embodiment, the first information block is used to indicate one of "00", "01", "10", and "11". A value in "00", "01", "10", or "11" indicates that the priority level is equal to 0, a value in "00", "01", "10", and "11" represents a priority level indication equal to 1, and HARQ-ACK bits with different priority levels are not multiplexed. A value in "00", "01", "10", and "11" represents a priority level indication equal to 1, and is associated with HARQ-ACK bit multiplexing with different priority levels, and the first candidate method is selected. A value in "00", "01", "10", and "11" represents a priority level indication equal to 1, and is associated with HARQ-ACK bit multiplexing with different priority levels, and the second candidate method is selected.

As an embodiment, the first information block is used to indicate one of "00", "01", "10", and "11". A value in "00", "01", "10", and "11" represents the first level index, a value in "00", "01", "10", and "11" represents the second level index, and the first bit block and the second bit block are not multiplexed together into the first PUCCH. A value in "00", "01", "10", and "11" represents the second level index, and the first bit block and the second bit block are multiplexed together into the first PUCCH, and the first candidate method is selected. A value in "00", "01", "10", and "11" represents the second level index, and the first bit block and the second bit block are multiplexed together into the first PUCCH, and the second candidate method is selected.

As an embodiment, the first information block is used to indicate one of "00", "01", "10", and "11". A value in "00", "01", "10", or "11" indicates that the priority level is equal to 0, a value in "00", "01", "10", and "11" represents a priority level indication equal to 1, and HARQ-ACK bits with different priority levels are not multiplexed. A value in "00", "01", "10", and "11" represents a priority level indication equal to 1, and is associated with HARQ-ACK bit multiplexing and separate coding for different priority levels. A value in "00", "01", "10", and "11" represents a priority level indication equal to 1, and is associated with HARQ-ACK bit multiplexing and joint coding for different priority levels.

As an embodiment, the first information block is used to indicate one of "00", "01", "10", and "11". "00" represents a priority level indication equal to 0, "01" represents a priority level indication equal to 1, and HARQ-ACK bits with different priority levels are not multiplexed. "10" represents HARQ-ACK bit multiplexing with priority level indication equal to 1 and with different priority levels, and the first candidate method, "11" represents HARQ-ACK bit multiplexing with priority level indication equal to 1 and with different priority levels, and the second candidate method is selected.

Eighth Embodiment

The eighth embodiment illustrates a schematic diagram of the relationship between the first PDCCH and the first PUCCH according to an embodiment of the present application, as shown in FIG. 8. In FIG. 8, the horizontal axis represents time, the vertical axis represents frequency, and the two rectangles represent the wireless resources occupied by the first PDCCH and the first PUCCH, respectively. The dashed lines with arrows between them represent the configuration relationship.

In the eighth embodiment, the second information block in the present application is used to determine whether the DCI format carried by the first PDCCH includes the first information block or not. The DCI format carried by the first PDCCH is used to determine the wireless resource occupied by the first PUCCH in the present application, and the DCI format carried by the first PDCCH is used to determine the priority index corresponding to the first PUCCH.

As an embodiment, the first PDCCH is the latest PDCCH among the PDCCHs associated with the time domain resources occupied by the first PUCCH.

As an embodiment, the first PDCCH is the latest PDCCH indicating the highest priority level among the PDCCHs associated with the time domain resources occupied by the first PUCCH.

As an embodiment, the first PDCCH includes an RF signal or baseband signal of the PDCCH.

As an embodiment, the first PDCCH is transmitted through a wireless interface.

As an embodiment, a DCI payload in DCI format is used to generate the first PDCCH.

As an embodiment, the first PDCCH occupies one PDCCH candidate.

As an embodiment, the first PDCCH carries the first information block.

As an embodiment, the first PDCCH occupies a positive integer number of control channel elements (CCEs).

As an embodiment, the number of CCEs occupied by the first PDCCH is equal to one of 1, 2, 4, 8, and 16.

As an embodiment, the first PDCCH is a PDCCH for scheduling the PDSCH, or the first PDCCH is a PDCCH for releasing semi persistent scheduling (SPS) PDSCH.

As an embodiment, the first PDCCH is a PDCCH for scheduling unicast PDSCH.

As an embodiment, the first PDCCH is a PDCCH for multicast or broadcast.

As an embodiment, the first PDCCH is a PDCCH for scheduling multicast or broadcast PDSCH.

As an embodiment, the first PDCCH is a PDCCH for scheduling the PDSCH, and radio network temporary identifier (RNTI) other than cell-RNTI (C-RNTI) is used to initialize the scrambling generator of the PDSCH scheduled by the first PDCCH.

As an embodiment, the CRC of the first PDCCH is scrambled by C-RNTI.

As an embodiment, the CRC of the first PDCCH is scrambled by RNTI other than C-RNTI.

As an embodiment, the technical feature "the DCI format carried by the first PDCCH is used to determine wireless resources occupied by the first PUCCH" in the claims includes the following operation: the DCI format carried by the first PDCCH is used by the first node device in the present application to determine the wireless resources occupied by the first PUCCH.

As an embodiment, the technical feature "the DCI format carried by the first PDCCH is used to determine wireless resources occupied by the first PUCCH" in the claims includes the following operation: the DCI format carried by the first PDCCH is used to explicitly or implicitly indicate the wireless resources occupied by the first PUCCH.

As an embodiment, the technical feature "the DCI format carried by the first PDCCH is used to determine wireless resources occupied by the first PUCCH" in the claims includes the following operation: the PRI domain in the DCI format carried by the first PDCCH is used to determine the wireless resources occupied by the first PUCCH.

As an embodiment, the technical feature "the DCI format carried by the first PDCCH is used to determine wireless resources occupied by the first PUCCH" in the claims includes the following operation: the PDSCH to HARQ feedback timing indicator domain in the DCI format carried by the first PDCCH is used to determine the wireless resources occupied by the first PUCCH.

As an embodiment, the technical feature "the DCI format carried by the first PDCCH is used to determine wireless resources occupied by the first PUCCH" in the claims includes the following operation: the PDSCH to HARQ feedback timing indicator domain and PRI domain in the DCI format carried by the first PDCCH are used to determine the wireless resources occupied by the first PUCCH.

As an embodiment, the wireless resources occupied by the first PUCCH include at least one of the time domain resources occupied by the first PUCCH, the frequency domain resources occupied by the first PUCCH, and the code domain resources occupied by the first PUCCH.

As an embodiment, the wireless resources occupied by the first PUCCH include at least one of the time domain resources occupied by the first PUCCH, the frequency domain resources occupied by the first PUCCH, and the sequence resources occupied by the first PUCCH.

As an embodiment, the wireless resources occupied by the first PUCCH include at least one of the OFDM symbols occupied by the first PUCCH, the PRB occupied by the first PUCCH, and the sequence adopted by the first PUCCH.

As an embodiment, the technical feature "the DCI format carried by the first PDCCH is used to determine a priority index corresponding to the first PUCCH" in the claims includes the following operation: the DCI format carried by the first PDCCH is used by the first node device in the present application to determine the priority index corresponding to the first PUCCH.

As an embodiment, the technical feature "the DCI format carried by the first PDCCH is used to determine a priority index corresponding to the first PUCCH" in the claims includes the following operation: the DCI format carried by the first PDCCH is used to explicitly or implicitly indicate the priority index corresponding to the first PUCCH.

As an embodiment, the technical feature "the DCI format carried by the first PDCCH is used to determine a priority index corresponding to the first PUCCH" in the claims includes the following operation: the priority indicator field in the DCI format carried by the first PDCCH is used to determine the priority index corresponding to the first PUCCH.

As an embodiment, the technical feature "the DCI format carried by the first PDCCH is used to determine a priority index corresponding to the first PUCCH" in the claims includes the following operation: the priority index corresponding to the first PUCCH is equal to the value of the priority indicator field in the DCI format carried by the first PDCCH.

As an embodiment, the technical feature "the DCI format carried by the first PDCCH is used to determine a priority index corresponding to the first PUCCH" in the claims includes the following operation: the priority index corresponding to the first PUCCH is equal to the value of the priority indicator field in the DCI format carried by the first PDCCH, and the value of the priority indicator field in the DCI format carried by the first PDCCH is equal to 1.

As an embodiment, the priority index corresponding to the first PUCCH is the value of the priority indicator field in the DCI format carried by the first PDCCH.

As an embodiment, the priority index corresponding to the first PUCCH is the priority index of the PDSCH corresponding to the HARQ-ACK bit carried by the first PUCCH.

As an embodiment, the priority index corresponding to the first PUCCH is equal to one of the first level index or the second level index.

Ninth Embodiment

The ninth embodiment illustrates a schematic diagram of the relationship between the first and second values and the target threshold according to an embodiment of the present application, as shown in FIG. 9. In FIG. 9, starting from an operation 1001, and whether the ratio of the first value and the second value is greater than a target threshold is determined in an operation 1002. In an operation 1003, the target coding method is the second candidate method, an in an operation 1004, the target coding method is the first candidate method.

In ninth embodiment, the number of HARQ-ACK bits in the first bit block in the present application is used to determine the first value, and the number of HARQ-ACK bits in the second bit block in the present application is used to determine the second value. The relationship between the ratio of the first value to the second value and the target threshold is used to determine the target coding method from the first candidate method and the second candidate method in the present application, and the first information block in the present application is used to determine the target threshold.

As an embodiment, the first value is a positive integer.

As an embodiment, the second value is a positive integer.

As an embodiment, the first value is greater than 0.

As an embodiment, the second value is greater than 0.

As an embodiment, the technical feature "the number of HARQ-ACK bits in the first bit block is used to determine a first value" in the claims includes the following operation: the number of HARQ-ACK bits in the first bit block is set by the first node in the present application to determine the first value.

As an embodiment, the technical feature "the number of HARQ-ACK bits in the first bit block is used to determine a first value" in the claims includes the following operation: the first value is equal to the number of HARQ-ACK bits in the first bit block.

As an embodiment, the technical feature "the number of HARQ-ACK bits in the first bit block is used to determine a first value" in the claims includes the following operation: the number of HARQ-ACK bits in the first bit block is used to calculate the first value.

As an embodiment, the technical feature "the number of HARQ-ACK bits in the first bit block is used to determine a first value" in the claims includes the following operation: the first value is equal to the number of bits in the first bit block after compression or HARQ-ACK bundling.

As an embodiment, the technical feature "the number of HARQ-ACK bits in the first bit block is used to determine a first value" in the claims includes the following operation: the first value is linearly related to the number of HARQ-ACK bits in the first bit block.

As an embodiment, the technical feature "the number of HARQ-ACK bits in the first bit block is used to determine a first value" in the claims includes the following operation: the number of HARQ-ACK bits in the first bit block is mathematically transformed to obtain the first value.

As an embodiment, the technical feature "the number of HARQ-ACK bits in the second bit block is used to determine a second value" in the claims includes the following operation: the number of HARQ-ACK bits in the second bit block is set by the first node in the present application to determine the second value.

As an embodiment, the technical feature "the number of HARQ-ACK bits in the second bit block is used to determine a second value" in the claims includes the following operation: the second value is equal to the number of HARQ-ACK bits in the second bit block.

As an embodiment, the technical feature "the number of HARQ-ACK bits in the second bit block is used to determine a second value" in the claims includes the following operation: the number of HARQ-ACK bits in the second bit block is used to calculate the second value.

As an embodiment, the technical feature "the number of HARQ-ACK bits in the second bit block is used to determine a second value" in the claims includes the following operation: the second value is equal to the number of bits in the second bit block after compression or HARQ-ACK bundling.

As an embodiment, the technical feature "the number of HARQ-ACK bits in the second bit block is used to determine a second value" in the claims includes the following operation: the second value is linearly related to the number of HARQ-ACK bits in the second bit block.

As an embodiment, the technical feature "the number of HARQ-ACK bits in the second bit block is used to determine a second value" in the claims includes the following operation: the number of HARQ-ACK bits in the second bit block is mathematically transformed to obtain the second value.

As an embodiment, the technical feature "the relationship between the ratio of the first value to the second value and the target threshold is used to determine the target coding method from the first candidate method and the second candidate method" in the claims includes the following operation: the relationship between the ratio of the first value to the second value and the target threshold is used by the first node device in the present application to determine the target coding method from the first candidate method and the second candidate method.

As an embodiment, the technical feature "the relationship between the ratio of the first value to the second value and the target threshold is used to determine the target coding method from the first candidate method and the second candidate method" in the claims includes the following operation: the relationship between the ratio of the first value to the second value and the target threshold is used to determine the target coding method from the first candidate method and the second candidate method based on the conditional relationship.

As an embodiment, the technical feature "the relationship between the ratio of the first value to the second value and the target threshold is used to determine the target coding method from the first candidate method and the second candidate method" in the claims includes the following operation: when the ratio of the first value to the second value is greater than the target threshold, the target coding method is the first candidate method; When the ratio of the first value to the second value is less than or equal to the target threshold, the target coding method is the second candidate method.

As an embodiment, the technical feature "the relationship between the ratio of the first value to the second value and the target threshold is used to determine the target coding method from the first candidate method and the second candidate method" in the claims includes the following operation: when the ratio of the first value to the second value is greater than or equal to the target threshold, the target coding method is the first candidate method; When the ratio of the first value to the second value is less than the target threshold, the target coding method is the second candidate method.

As an embodiment, the technical feature "the relationship between the ratio of the first value to the second value and the target threshold is used to determine the target coding method from the first candidate method and the second candidate method" in the claims includes the following operation: when the ratio of the first value to the second value is less than the target threshold, the target coding method is the first candidate method; When the ratio of the first value to the second value is greater than or equal to the target threshold, the target coding method is the second candidate method.

As an embodiment, the technical feature "the relationship between the ratio of the first value to the second value and the target threshold is used to determine the target coding method from the first candidate method and the second candidate method" in the claims includes the following operation: when the ratio of the first value to the second value is less than or equal to the target threshold, the target coding method is the first candidate method; When the ratio of the first value to the second value is greater than the target threshold, the target coding method is the second candidate method.

As an embodiment, the technical feature "the first information block is used to determine the target threshold" in the claims includes the following operation: the first information block is used by the first node device in the present application to determine the target threshold.

As an embodiment, the technical feature "the first information block is used to determine the target threshold" in the claims includes the following operation: the first information block is used to explicitly or implicitly indicate the target threshold.

As an embodiment, the technical feature "the first information block is used to determine the target threshold" in the claims includes the following operation: the first information block is used to explicitly or implicitly indicate the target threshold among multiple predefined candidate thresholds.

As an embodiment, the technical feature "the first information block is used to determine the target threshold" in the claims includes the following operation: the target threshold is one of P1 candidate thresholds, the P1 is a positive integer greater than 1, the P1 candidate thresholds are predefined or fixed or configurable, and the first information block is used to determine the target threshold from the P1 candidate thresholds. As a subsidiary embodiment of the above embodiment, any one of the P1 candidate thresholds is greater than 0. As a subsidiary embodiment of the above embodiment, any one of the P1 candidate thresholds is less than 0. As a subsidiary embodiment of the above embodiment, among the P1 candidate thresholds, there is one candidate threshold equal to 1. As a subsidiary embodiment of the above embodiment, one of the P1 candidate thresholds is less than 1. As a subsidiary embodiment of the above embodiment, one of the P1 candidate thresholds is greater than 1.

Tenth Embodiment

Figure 10:
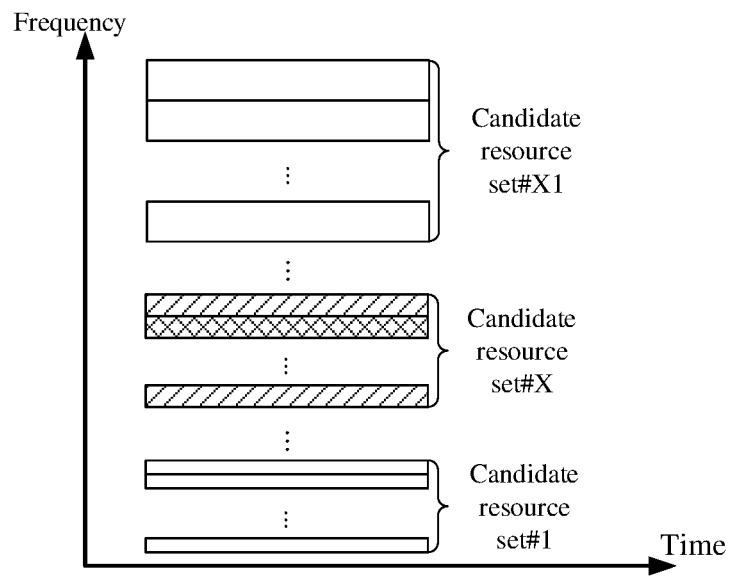
FIG. 10 is a schematic diagram of a first resource set according to still another embodiment of the present application.

The tenth embodiment illustrates a schematic diagram of a first resource set according to an embodiment of the present application, as shown in FIG. 10. In FIG. 10, the horizontal axis represents time, the vertical axis represents frequency, each rectangle represents a resource block, each filled rectangle represents a resource block in the first resource set, and the cross filled rectangle represents the first resource block.

In the tenth embodiment, the first resource block includes the time-frequency resources occupied by the first PUCCH in the present application, and the first resource block belongs to the first resource set. The first resource set is one of X1 candidate resource sets, where X1 is a positive integer greater than 1, and any one of the X1 candidate resource sets includes at least one resource block. The number of HARQ-ACK bits in the first bit block in the present application and the number of HARQ-ACK bits in the second bit block in the present application are used together to determine the first resource set from the X1 candidate resource sets. The sum of the number of HARQ-ACK bits in the first bit block and the number of HARQ-ACK bits in the second bit block is greater than 2.

As an embodiment, the first resource block is a time-frequency resource corresponding to a PUCCH resource.

As an embodiment, the first resource block includes at least one PRB in the frequency domain.

As an embodiment, the first resource block includes at least one OFDM symbol in the time domain.

As an embodiment, the frequency domain resources in the first resource block are continuous in the frequency domain.

As an embodiment, the frequency domain resources in the first resource block are discretized in the frequency domain.

As an embodiment, the time domain resources in the first resource block are continuous in the time domain.

As an embodiment, the time domain resources in the first resource block are discretized in the time domain.

As an embodiment, the first resource block occupies the same frequency domain resources on any two OFDM symbols in the time domain.

As an embodiment, the first resource block occupies different frequency domain resources on the two OFDM symbols in the time domain.

As an embodiment, the first resource block includes frequency hopping frequency domain resources.

As an embodiment, the first resource block does not include frequency hopping frequency domain resources.

As an embodiment, the first resource block only includes the time-frequency resources occupied by the first PUCCH.

As an embodiment, the first resource block further includes time frequency resources in addition to the time frequency resources occupied by the first PUCCH.

As an embodiment, the first resource block corresponds to a PUCCH resource ID.

As an embodiment, the first resource set is a PUCCH resource set.

As an embodiment, the first resource set only includes the first resource block.

As an embodiment, any one of the X1 candidate resource sets is a PUCCH resource set.

As an embodiment, any one of the X1 candidate resource sets corresponds to a PUCCH resource set ID.

As an embodiment, any one of the X1 candidate resource sets includes only one PUCCH resource.

As an embodiment, any one of the X1 candidate resource sets includes more than one PUCCH resource.

As an embodiment, any resource block in any of the X1 candidate resource sets is a PUCCH resource.

As an embodiment, any one of the X1 candidate resource sets includes only one PUCCH resource for a SPS PDSCH.

As an embodiment, any resource block in any of the X1 candidate resource sets is a PUCCH resource for a SPS PDSCH.

As an embodiment, any one of the X1 candidate resource sets includes only one PUCCH resource configured to support HARQ-ACK multiplexing with different priority levels.

As an embodiment, any one of the X1 candidate resource sets includes a PUCCH resource configured to support HARQ-ACK multiplexing with different priority levels.

As an embodiment, any resource block in any of the X1 candidate resource sets is a PUCCH resource configured to support HARQ-ACK multiplexing with different priority levels.

As an embodiment, the X1 candidate resource sets are predefined or configurable.

As an embodiment, the first information block is used to determine the X1 candidate resource sets.

As an embodiment, the second information block in the present application is used to determine the X1 candidate resource sets.

As an embodiment, the information blocks outside of the first information block and the second information block in the present application are used to determine the X1 candidate resource sets.

As an embodiment, X1 is equal to 4.

As an embodiment, X1 is equal to 8.

As an embodiment, X1 is equal to 16.

As an embodiment, the X1 is greater than 4.

As an embodiment, the number of HARQ-ACK bits in the first bit block is greater than 2.

As an embodiment, the number of HARQ-ACK bits in the first bit block is not greater than 2.

As an embodiment, the number of HARQ-ACK bits in the second bit block is greater than 2.

As an embodiment, the number of HARQ-ACK bits in the second bit block is not greater than 2.

As an embodiment, the technical feature "the number of HARQ-ACK bits in the first bit block and the number of HARQ-ACK bits in the second bit block are used together to determine the first resource set from the X1 candidate resource sets" in the claims includes the following operation: the number of HARQ-ACK bits in the first bit block and the number of HARQ-ACK bits in the second bit block are used by the first node device in the present application to determine the first resource set from the X1 candidate resource sets.

As an embodiment, the technical feature "the number of HARQ-ACK bits in the first bit block and the number of HARQ-ACK bits in the second bit block are used together to determine the first resource set from the X1 candidate resource sets" in the claims includes the following operation: the sum of the number of HARQ-ACK bits in the first bit block and the number of HARQ-ACK bits in the second bit block is used to determine the first resource set from the X1 candidate resource sets.

As an embodiment, the technical feature "the number of HARQ-ACK bits in the first bit block and the number of HARQ-ACK bits in the second bit block are used together to determine the first resource set from the X1 candidate resource sets" in the claims includes the following operation: the first value and the second value in the present application are used to determine the first resource set from the X1 candidate resource sets.

As an embodiment, the technical feature "the number of HARQ-ACK bits in the first bit block and the number of HARQ-ACK bits in the second bit block are used together to determine the first resource set from the X1 candidate resource sets" in the claims includes the following operation: the sum of the first value and the second value in the present application is used to determine the first resource set from the X1 candidate resource sets.

As an embodiment, the technical feature "the number of HARQ-ACK bits in the first bit block and the number of HARQ-ACK bits in the second bit block are used together to determine the first resource set from the X1 candidate resource sets" in the claims includes the following operation: the number of HARQ-ACK bits in the first bit block and the number of HARQ-ACK bits in the third bit block in the present application are used together to determine the first resource set from the X1 candidate resource sets.

As an embodiment, the technical feature "the number of HARQ-ACK bits in the first bit block and the number of HARQ-ACK bits in the second bit block are used together to determine the first resource set from the X1 candidate resource sets" in the claims includes the following operation: the sum of the number of HARQ-ACK bits in the first bit block and the number of HARQ-ACK bits in the third bit block in the present application is used to determine the first resource set from the X1 candidate resource sets.

As an embodiment, the technical feature "the number of HARQ-ACK bits in the first bit block and the number of HARQ-ACK bits in the second bit block are used together to determine the first resource set from the X1 candidate resource sets" in the claims includes the following operation: the number of HARQ-ACK bits in the first bit block and the number of HARQ-ACK bits in the second bit block are used together to calculate feature values. The X1 candidate resource sets correspond to X1 numerical ranges, and the first numerical range is the numerical range corresponding to the first resource set among the X1 numerical ranges. The feature values belong to the first numerical range. As a subsidiary embodiment of the above embodiment, the correspondence between the X1 candidate resource sets and the X1 numerical ranges is predefined. As a subsidiary embodiment of the above embodiment, the correspondence between the X1 candidate resource sets and the X1 numerical ranges is configurable. As a subsidiary embodiment of the above embodiment, the X1 numerical ranges are predefined or configurable. As a subsidiary embodiment of the above embodiment, the feature value is equal to the sum of the number of HARQ-ACK bits in the first bit block and the number of HARQ-ACK bits in the second bit block. As a subsidiary embodiment of the above embodiment, the feature value is equal to the sum of the first value and the second value in the present application. As a subsidiary embodiment of the above embodiment, the feature value is equal to the sum of the number of HARQ-ACK bits in the first bit block and the number of HARQ-ACK bits in the third bit block in the present application.

As an embodiment, the DCI format carried by the first PDCCH in the present application is used to indicate the first resource block from the first resource set.

As an embodiment, the PRI in the DCI format carried by the first PDCCH in the present application is used to indicate the first resource block from the first resource set.

As an embodiment, the index of the CCEs occupied by the first PDCCH in the present application is used to indicate the first resource block from the first resource set.

Eleventh Embodiment

Figure 11:
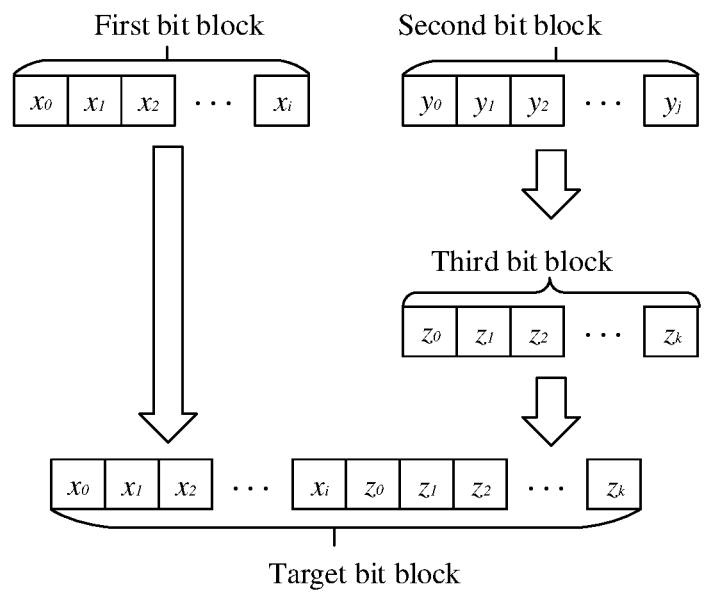
FIG. 11 is a schematic diagram of a target bit block according to still another embodiment of the present application.

The eleventh embodiment illustrates a schematic diagram of a target bit block according to an embodiment of the present application, as shown in FIG. 11. In FIG. 11, each small rectangle represents one bit.

In the eleventh embodiment, the second bit block in the present application is used to determine a third bit block, which includes at least one bit. The number of bits in the third bit block is not greater than the number of HARQ-ACK bits in the second bit block. The bits in the first bit block and the bits in the third bit block in the present application are sequentially concatenated to obtain a target bit block, which is used to generate the first PUCCH in the present application through channel coding.

As an embodiment, the number of bits in the third bit block is smaller than the number of HARQ-ACK bits in the second bit block.

As an embodiment, the number of bits in the third bit block is equal to the number of HARQ-ACK bits in the second bit block.

As an embodiment, the technical feature "the second bit block is used to determine a third bit block" in the claims includes the following operation: the second bit block is used by the first node device in the present application to determine the third bit block.

As an embodiment, the technical feature "the second bit block is used to determine a third bit block" in the claims includes the following operation: the third bit block is the second bit block.

As an embodiment, the technical feature "the second bit block is used to determine a third bit block" in the claims includes the following operation: the third bit block is obtained by compressing the second bit block.

As an embodiment, the technical feature "the second bit block is used to determine a third bit block" in the claims includes the following operation: the third bit block is obtained by bundling the second bit block.

As an embodiment, the technical feature "the second bit block is used to determine a third bit block" in the claims includes the following operation: the third bit block is obtained by sampling the second bit block.

As an embodiment, the third bit block only includes one bit.

As an embodiment, the third bit block includes more than one bit.

As an embodiment, the target bit block is a bit block obtained by concatenating the bits in the first bit block and the bits in the third bit block in the order of the first bit block followed by the third bit block.

As an embodiment, the target bit block is a bit block obtained by concatenating the bits in the first bit block and the bits in the third bit block in the order of first the third bit block and then the first bit block.

As an embodiment, the bits in the first bit block are sequentially mapped to the target bit block from the least significant bit (LSB) of the first bit block to the most significant bit (MSB) from the LSB of the target bit block, and then the bits in the third bit block are sequentially mapped to the target bit block from the LSB of the third bit block to the MSB.

As an embodiment, the bits in the first bit block are sequentially mapped from the MSB to LSB of the first bit block, starting from the LSB of the target bit block, to the target bit block, and then the bits in the third bit block are mapped from the MSB to LSB of the third bit block to the target bit block.

As an embodiment, the bits in the third bit block are sequentially mapped from the LSB of the third bit block to the MSB, starting from the LSB of the target bit block, and then the bits in the first bit block are mapped from the LSB of the first bit block to the MSB, and then onto the target bit block.

As an embodiment, the bits in the third bit block are sequentially mapped from the MSB to LSB of the third bit block, starting from the LSB of the target bit block, to the target bit block, and then the bits in the first bit block are mapped from the MSB to LSB of the first bit block to the target bit block.

As an embodiment, the bits in the first bit block are sequentially mapped from the LSB of the first bit block to the MSB, starting from the LSB of the target bit block, and then the bits in the third bit block are mapped from the MSB to the LSB of the third bit block to the target bit block.

As an embodiment, the number of bits in the target bit block is equal to the sum of the number of bits in the first bit block and the number of bits in the third bit block.

As an embodiment, the technical feature "the target bit block is coded through a channel" in the claims includes: the target bit block is directly input to a channel encoder.

As an embodiment, the technical feature "the target bit block is coded through a channel" in the claims includes: the target bit block is processed and input to a channel encoder.

As an embodiment, the technical feature "the target bit block is used in channel coding" in the claims includes: a UCI bit sequence is generated, segmenting a code block is segmented, and the target bit block is input into a channel encoder after being attached to a CRC.

As an embodiment, the technical feature "the target bit block is used in channel coding" in the claims includes: the processed bits of the target bit block are coded through a channel.

As an embodiment, the technical feature "the target bit block is used in channel coding" in the claims includes: a UCI bit sequence is generated, segmenting a code block is segmented, and the target bit block is input into a channel encoder after being attached to a CRC.

As an embodiment, the technical feature "the target bit block is used in channel coding" in the claims includes: a UCI bit sequence is generated, and the target bit block is input into a channel encoder after being attached to a CRC.

As an embodiment, the technical feature "the target bit block is used in channel coding" in the claims includes: the target bit block is sequentially compressed or bundled, a UCI bit sequence is generated, and the target bit block is input into a channel encoder after being attached to a CRC.

As an embodiment, the technical feature "the target bit block is used in channel coding" in the claims includes: the target bit block is sequentially compressed or bundled, a UCI bit sequence is generated, a code block is segmented, and the target bit block is input into a channel encoder after being attached to a CRC.

As an embodiment, the technical feature "the target bit block is used to generate the first PUCCH through channel coding" in the claims includes the following operation: the target bit block is used by the first node device in the present application to generate the first PUCCH through channel coding.

As an embodiment, the technical feature "the target bit block is used to generate the first PUCCH through channel coding" in the claims includes the following operation: a bit sequence obtained by the target bit block through channel coding is sequentially processed by at least one of rate matching, scrambling, modulation, and spreading or block-wise spreading, mapping to physical resources, OFDM baseband signal generation, modulation and upconversion to generate the first PUCCH.

Twelfth Embodiment

Figure 12:
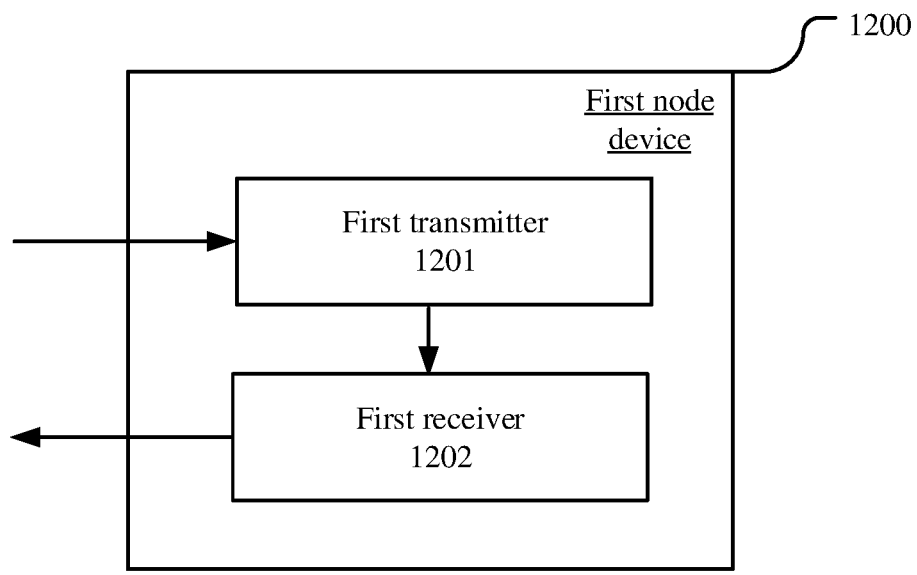
FIG. 12 is a structural block diagram of a processing device in a first node device according to still another embodiment of the present application.

The twelfth embodiment illustrates a structural block diagram of a processing device in a first node device in an embodiment of the present application, as shown in FIG. 12. In FIG. 12, the processing device 1200 of the first node device includes a first receiver 1201 and a first transmitter 1202. The first receiver 1201 includes a transmitter/receiver 456 (including the antenna 460), a receiving processor 452, and a controller/processor 490 as shown in FIG. 4 of the present application. The first transmitter 1202 includes a transmitter/receiver 456 (including the antenna 460) and a transmitting processor 455 in FIG. 4 of the present application.

In the twelfth embodiment, a first receiver 1201 receives a first information block, and the first transmitter 1202 transmits a first PUCCH, where a first bit block and a second bit block are used to generate the first PUCCH through the target coding method. The first bit block includes at least one HARQ-ACK bit, and the second bit block includes at least one HARQ-ACK bit. The target coding method is one of a first candidate method or a second candidate method, and the first information block is used to determine the target coding method from the first candidate method and the second candidate method. In response to the target coding method being the first candidate method, a bit block obtained by the first bit block through channel coding and a bit block obtained by the second bit block through channel coding are used together to generate the first PUCCH. In response to the target coding method being the second candidate method, bit blocks generated together with the first bit block and the second bit block are used to generate the first PUCCH through channel coding; a priority index of HARQ-ACK bits in the first bit block is equal to a first level index, a priority index of HARQ-ACK bits in the second bit block is equal to the second level index, and the first level index is not equal to the second level index.

As an embodiment, the first information block is used to determine whether the first bit block and the second bit block are multiplexed together into the first PUCCH or not.

As an embodiment, the first receiver 1201 receives a second information block. Among them, the second information block is used to determine whether the DCI format carried by the first PDCCH includes the first information block or not. The DCI format carried by the first PDCCH is used to determine the wireless resources occupied by the first PUCCH, and the DCI format carried by the first PDCCH is used to determine the priority index corresponding to the first PUCCH.

As an embodiment, a DCI is used to indicate the coding method of the HARQ-ACK bits with different priority levels, which can be dynamically adjusted according to the situation, improving configuration flexibility while further optimizing the transmission performance of the HARQ-ACK bits.

As an embodiment, the number of HARQ-ACK bits in the first bit block is used to determine the first value, and the number of HARQ-ACK bits in the second bit block is used to determine the second value. The relationship between the ratio of the first value to the second value and the target threshold is used to determine the target coding method from the first candidate method and the second candidate method, and the first information block is used to determine the target threshold.

As an embodiment, by configuring the threshold of the ratio of the number of HARQ-ACK bits with different priority levels through signaling, the HARQ-ACK bits with different priority levels can be dynamically adjusted according to the situation, while improving configuration flexibility and further optimizing the transmission performance of HARQ-ACK.

As an embodiment, the first resource block includes the time-frequency resources occupied by the first PUCCH, and the first resource block belongs to the first resource set. The first resource set is one of X1 candidate resource sets, where X1 is a positive integer greater than 1, and any one of the X1 candidate resource sets includes at least one resource block. The number of HARQ-ACK bits in the first bit block and the number of HARQ-ACK bits in the second bit block are used together to determine the first resource set from the X1 candidate resource sets. The sum of the number of HARQ-ACK bits in the first bit block, and the number of HARQ-ACK bits in the second bit block is greater than 2.

As an embodiment, the second bit block is used to determine a third bit block, which includes at least one bit, and the number of bits in the third bit block is not greater than the number of HARQ-ACK bits in the second bit block. The bits in the first bit block and the bits in the third bit block are sequentially concatenated to obtain a target bit block, which is used to generate the first PUCCH through channel coding.

As an embodiment, the first transmitter 1202 transmits the third information block.

Among them, the third information block is used to indicate that the first node device supports HARQ-ACK bit multiplexing with different priority levels.

Thirteenth Embodiment

Figure 13:
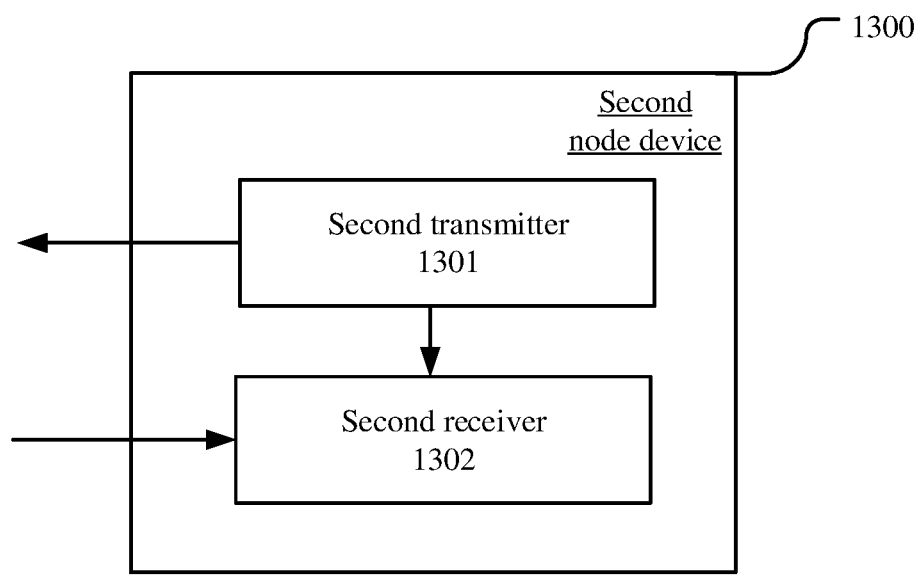
FIG. 13 is a structural block diagram of a processing device in a second node device according to still another embodiment of the present application.

The thirteenth embodiment illustrates a structural block diagram of a processing device in a second node device in an embodiment according to the present application, as shown in FIG. 13. In FIG. 13, the processing device 1300 of the second node device includes a second transmitter 1301 and a second receiver 1302. The second transmitter 1301 includes a transmitter/receiver 416 (including the antenna 460), a transmitting processor 415, and a controller/processor 440 as shown in FIG. 4 of the present application. The second receiver 1302 includes a transmitter/receiver 416 (including the antenna 460) and a receiving processor 412 in FIG. 4 of the present application.

In the thirteenth embodiment, the second receiver 1302 receives a first information block, and the second transmitter 1301 transmits a first PUCCH, where a first bit block and a second bit block are used to generate the first PUCCH through the target coding method. The first bit block includes at least one HARQ-ACK bit, and the second bit block includes at least one HARQ-ACK bit. The target coding method is one of a first candidate method or a second candidate method, and the first information block is used to determine the target coding method from the first candidate method and the second candidate method. In response to the target coding method being the first candidate method, a bit block obtained by the first bit block through channel coding and a bit block obtained by the second bit block through channel coding are used together to generate the first PUCCH. In response to the target coding method being the second candidate method, bit blocks generated together with the first bit block and the second bit block are used to generate the first PUCCH through channel coding. A priority index of HARQ-ACK bits in the first bit block is equal to a first level index, a priority index of HARQ-ACK bits in the second bit block is equal to the second level index, and the first level index is not equal to the second level index.

As an embodiment, the first information block is used to indicate that the first bit block and the second bit block are multiplexed together into the first PUCCH.

As an embodiment, the second transmitter 1301 transmits the second information block. Among them, the second information block is used to indicate that the DCI format carried by the first PDCCH includes the first information block, the DCI format carried by the first PDCCH is used to determine the wireless resources occupied by the first PUCCH, and the DCI format carried by the first PDCCH is used to determine the priority index corresponding to the first PUCCH.

As an embodiment, the number of HARQ-ACK bits in the first bit block is used to determine the first value, and the number of HARQ-ACK bits in the second bit block is used to determine the second value. The relationship between the ratio of the first value to the second value and the target threshold is used to determine the target coding method from the first candidate method and the second candidate method, and the first information block is used to determine the target threshold.

As an embodiment, the first resource block includes the time-frequency resources occupied by the first PUCCH, and the first resource block belongs to the first resource set. The first resource set is one of X1 candidate resource sets, where X1 is a positive integer greater than 1, and any one of the X1 candidate resource sets includes at least one resource block. The number of HARQ-ACK bits in the first bit block and the number of HARQ-ACK bits in the second bit block are used together to determine the first resource set from the X1 candidate resource sets. The sum of the number of HARQ-ACK bits in the first bit block and the number of HARQ-ACK bits in the second bit block is greater than 2.

As an embodiment, the second bit block is used to determine a third bit block, which includes at least one bit, and the number of bits in the third bit block is not greater than the number of HARQ-ACK bits in the second bit block. The bits in the first bit block and the bits in the third bit block are sequentially concatenated to obtain a target bit block, which is used to generate the first PUCCH through channel coding.

As an embodiment, the second receiver 1302 is configured receive a third information block. Among them, the third information block is used to indicate that the first node device supports HARQ-ACK bit multiplexing with different priority levels.

Those of ordinary skills in the art can understand that all or part of the operations in the above method can be completed by instructing the relevant hardware through a program, which can be stored in a computer-readable storage medium, such as read-only memory, hard disk, or optical disc. Optionally, all or part of the operations of the above embodiments can also be implemented using one or more integrated circuits. Correspondingly, the various module units in the above embodiments can be implemented in hardware form or in the form of software functional modules. The present application is not limited to any specific form of combination of software and hardware. The first node device, the second node device, the UE, or the terminal in the present application includes but is not limited to mobile phones, tablets, laptops, network cards, low-power devices, LTE enhancements for machine type communication (eMTC) devices, narrow band internet of things (NB IoT) devices, on-board communication devices, aircrafts, drones, remote controlled aircrafts, testing equipment, testing devices, testing instruments, and other equipment. The base station equipment, the base station or network side equipment in the present application includes but is not limited to macro-cell base stations, micro-cell base stations, home base stations, relay base stations, eNBs, gNBs, transmission and reception points (TRP), relay satellites, satellite base stations, air base stations, test devices, test equipment, test instruments and other equipment.

The above is only preferred embodiments of the present application and is not intended to limit the scope of protection of the present application. Any modifications, equivalent replacements, improvements made within the spirit and principles of the present application fall within the scope of protection of the present application.

What is claimed is:

1. A first node device for wireless communication, comprising:
a first receiver to receive a first information block; and
a first transmitter to transmit a first physical uplink control channel (PUCCH), wherein a first bit block and a second bit block are used to generate the first PUCCH through a target coding method, the first bit block comprises at least one hybrid automatic repeat request-acknowledgement (HARQ-ACK) bit, and the second bit block comprises at least one HARQ-ACK bit, wherein
the target coding method is one of a first candidate method or a second candidate method, and the first information block is used to determine the target coding method from the first candidate method and the second candidate method; in response to the target coding method being the first candidate method, a bit block obtained by the first bit block through channel coding and a bit block obtained by the second bit block through channel coding are used together to generate the first PUCCH; in response to the target coding method being the second candidate method, bit blocks generated together with the first bit block and the second bit block are used to generate the first PUCCH through channel coding; a priority index of HARQ-ACK bits in the first bit block is equal to a first level index, a priority index of HARQ-ACK bits in the second bit block is equal to the second level index, and the first level index is not equal to the second level index.

2. The first node device according to claim 1, wherein the first information block is used to determine that the first bit block and the second bit block are multiplexed together into the first PUCCH.

3. The first node device according to claim 1, wherein the first information block comprises a first sub information block and a second sub information block, the first sub information block is used to indicate that the first information block is used to determine that the first bit block and the second bit block are multiplexed together into the first PUCCH, and the second sub information block is used to indicate the target coding method from the first candidate method and the second candidate method.

4. The first node device according to claim 1, wherein the first receiver receives a second information block, the second information block is used to determine that a downlink control information (DCI) format carried by a first physical uplink control channel (PDCCH) comprises the first information block, the DCI format carried by the first PDCCH is used to determine wireless resources occupied by the first PUCCH, and the DCI format carried by the first PDCCH is used to determine a priority index corresponding to the first PUCCH.

5. The first node device according to claim 4, wherein the second information block is used to determine whether the first bit block and the second bit block are multiplexed together into the first PUCCH or not.

6. The first node device according to claim 4, wherein the second information block is used to indicate that HARQ-ACK bits with different priority levels are multiplexed into a same PUCCH.

7. The first node device according to claim 4, wherein the wireless resources occupied by the first PUCCH comprise at least one of time domain resources occupied by the first PUCCH, frequency domain resources occupied by the first PUCCH, and code domain resources occupied by the first PUCCH.

8. The first node device according to claim 4, wherein the priority index corresponding to the first PUCCH is equal to one of the first level index or the second level index.

9. The first node device according to claim 1, wherein the number of HARQ-ACK bits in the first bit block is used to determine a first value, and the number of HARQ-ACK bits in the second bit block is used to determine a second value; a relationship between the ratio of the first value to the second value and a target threshold is used to determine the target coding method from the first candidate method and second candidate method, and the first information block is used to determine the target threshold.

10. The first node device according to claim 9, wherein the first value is linearly related to the number of HARQ-ACK bits in the first bit block, and the second value is linearly related to the number of HARQ-ACK bits in the second bit block.

11. The first node device according to claim 1, wherein a first resource block comprises time-frequency resources occupied by the first PUCCH, and the first resource block belongs to a first resource set, wherein the first resource set is one of X1 candidate resource sets, X1 is a positive integer greater than 1, and any one of the X1 candidate resource sets comprises at least one resource block; wherein the number of HARQ-ACK bits in the first bit block and the number of HARQ-ACK bits in the second bit block are used together to determine the first resource set from the X1 candidate resource sets, and the sum of the number of HARQ-ACK bits in the first bit block and the number of HARQ-ACK bits in the second bit block is greater than 2.

12. The first node device according to claim 11, wherein the number of HARQ-ACK bits in the first bit block is used to determine a first value, and the number of HARQ-ACK bits in the second bit block is used to determine a second value, the first value and the second value are used to determine the first resource set from the X1 candidate resource sets.

13. The first node device according to claim 12, wherein the sum of the first value and the second value is used to determine the first resource set from the X1 candidate resource sets.

14. The first node device according to claim 11, wherein the first information block is used to determine the X1 candidate resource sets.

15. The first node device according to claim 1, wherein the second bit block is used to determine a third bit block, the third bit block comprises at least one bit, and the number of bits in the third bit block is not greater than the number of HARQ-ACK bits in the second bit block; wherein the bits in the first bit block and the bits in the third bit block are sequentially concatenated to obtain a target bit block, and the target bit block is used to generate the first PUCCH through channel coding.

16. The first node device according to claim 1, wherein the first transmitter transmits a third information block, and the third information block is used to indicate that the first node device supports HARQ-ACK bit multiplexing with different priority levels.

17. The first node device according to claim 16, wherein the third information block is used to indicate that the first node device supports HARQ-ACK bit multiplexing with different priority levels into a same PUCCH.

18. The first node device according to claim 16, wherein the third information block is used to indicate that the first node device supports the first bit block and the second bit block for multiplexing into the first PUCCH.

19. A second node device for wireless communication, comprising:

a second receiver to receive a first information block; and a second transmitter to transmit a first physical uplink control channel (PUCCH), wherein a first bit block and a second bit block are used to generate the first PUCCH through a target coding method, the first bit block comprises at least one hybrid automatic repeat request-acknowledgement (HARQ-ACK) bit, and the second bit block comprises at least one HARQ-ACK bit, wherein the target coding method is one of a first candidate method or a second candidate method, and the first information block is used to determine the target coding method from the first candidate method and the second candidate method; in response to the target coding method being the first candidate method, a bit block obtained by the first bit block through channel coding and a bit block obtained by the second bit block through channel coding are used together to generate the first PUCCH; in response to the target coding method being the second candidate method, bit blocks generated together with the first bit block and the second bit block are used to generate the first PUCCH through channel coding; a priority index of HARQ-ACK bits in the first bit block is equal to a first level index, a priority index of HARQ-ACK bits in the second bit block is equal to the second level index, and the first level index is not equal to the second level index.

20. A method applied to a first node for wireless communication, comprising:

receiving a first information block; and transmitting a first physical uplink control channel (PUCCH), wherein a first bit block and a second bit block are used to generate the first PUCCH through a target coding method, the first bit block comprises at least one hybrid automatic repeat request-acknowledgement (HARQ-ACK) bit, and the second bit block comprises at least one HARQ-ACK bit, wherein the target coding method is one of a first candidate method or a second candidate method, and the first information block is used to determine the target coding method from the first candidate method and the second candidate method; in response to the target coding method being the first candidate method, a bit block obtained by the first bit block through channel coding and a bit block obtained by the second bit block through channel coding are used together to generate the first PUCCH; in response to the target coding method being the second candidate method, bit blocks generated together with the first bit block and the second bit block are used to generate the first PUCCH through channel coding; a priority index of HARQ-ACK bits in the first bit block is equal to a first level index, a priority index of HARQ-ACK bits in the second bit block is equal to the second level index, and the first level index is not equal to the second level index.

* * * * *